United States Patent
Miyagi et al.

(10) Patent No.: US 8,224,911 B2
(45) Date of Patent: Jul. 17, 2012

(54) INFORMATION DISTRIBUTION SYSTEM AND METHOD

(75) Inventors: Shiro Miyagi, Tokyo (JP); Mihoko Kamei, Kanagawa (JP); Kimio Maki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/732,522

(22) Filed: Mar. 26, 2010

(65) Prior Publication Data

US 2010/0185742 A1 Jul. 22, 2010

Related U.S. Application Data

(63) Continuation of application No. 10/398,275, filed as application No. PCT/JP02/07867 on Aug. 1, 2002, now Pat. No. 7,707,253.

(30) Foreign Application Priority Data

Aug. 7, 2001 (JP) ................................ P2001-239692

(51) Int. Cl.
*G06F 15/16* (2006.01)
(52) U.S. Cl. ......... 709/206; 709/203; 709/204; 709/219
(58) Field of Classification Search .................. 709/203, 709/204, 219, 206
See application file for complete search history.

(56) References Cited

U.S. PATENT DOCUMENTS

| | | | | |
|---|---|---|---|---|
| 6,026,433 A | * | 2/2000 | D'Arlach et al. | 709/217 |
| 6,449,635 B1 | * | 9/2002 | Tilden et al. | 709/206 |
| 6,760,749 B1 | * | 7/2004 | Dunlap et al. | 709/204 |
| 2001/0042093 A1 | | 11/2001 | Shirai et al. | |

FOREIGN PATENT DOCUMENTS

| | | |
|---|---|---|
| JP | 1-173265 | 7/1989 |
| JP | 5 2539 | 1/1993 |
| JP | 8-227453 | 9/1996 |
| JP | 9-305472 | 11/1997 |

(Continued)

OTHER PUBLICATIONS

Patent Abstracts of Japan, Publication No. 05-002539, Publication Date Jan. 8, 1993.

(Continued)

*Primary Examiner* — Adnan Mirza
(74) *Attorney, Agent, or Firm* — Frommer Lawrence & Haug LLP; William S. Frommer; Thomas F. Presson

(57) ABSTRACT

An information distribution system 3 including a portable telephone set (70), having a display unit for displaying image data, and a communication function, and owned by a user, an image data processing device (11), having an image data processing function and a communication function, a server (12) for storing image data transmitted from the image data processing device (11), and a portable telephone base station 13 connected to the portable telephone set (15) over a portable telephone communication network (14). A list of the addresses formulated in the past is displayed on a display unit of the portable telephone set (70). The text data included in the data referenced by the address selected from the list of addresses displayed is modified and a new address is appended to the modified data.

19 Claims, 33 Drawing Sheets

FOREIGN PATENT DOCUMENTS

| | | |
|---|---|---|
| JP | 10-145421 | 5/1998 |
| JP | 10 224588 | 8/1998 |
| JP | 11 3299 | 1/1999 |
| JP | 11 41276 | 2/1999 |
| JP | 11-215345 | 8/1999 |
| JP | 11-224228 | 8/1999 |
| JP | 2000-76153 | 3/2000 |
| JP | 2000-163350 | 6/2000 |
| JP | 2000 236412 | 8/2000 |
| JP | 2001-109678 | 4/2001 |
| WO | WO 01 41446 | 6/2001 |

OTHER PUBLICATIONS

Patent Abstracts of Japan, Publication No. 10-224588, Publication Date Aug. 21, 1998.

Medina M: "Scan to email or straight to the Web" Imaging & Document Solutions, Miller Freeman, New York, vol. 9, No. 6, Jun. 1, 2000, p. 21, 23, XP009105237 ISSN: 1083-2912.

Masaki OISHI i Mode Web HTML Reference, first edition, Softbank Publishing Inc., Aug. 25, 2000, pp. 97 to 99.

* cited by examiner

YOUR PORTABLE TELEPHONE IS NOT AN SSL-CONFORMABLE PORTABLE TELEPHONE UNIT. WE ARE SORRY, BUT YOU CANNOT USE THIS FUNCTION.

\* IN ORDER TO USE THIS FUNCTION, YOU NEED TO INPUT THE CUSTOMER ID AND PASSWORD. TO PROTECT YOUR PERSONAL DATA, WE ALLOW ONLY SSL-CONFORMABLE TELEPHONE UNITS.

■ BACK

FIG.20

HAVE YOU FINISHED REGISTRATION TO THE INFORMATION DISTRIBUTION SERVICE FUNCTION? IN ORDER TO USE THIS FUNCTION, REGISTRATION IS NECESSARY. FOLLOW THE REGISTRATION PROCEDURE.

BACK

CONFIRMATION OF TRANSMISSION DESTINATIONS

09012345678@○○○.ne.jp
09098765432@○○○.ne.jp
09012121212@○○○.ne.jp
09023232323@○○○.ne.jp
09034343434@○○○.ne.jp
09045454545@○○○.ne.jp

■ <u>BACK</u>

FIG.26

INFORMATION DISTRIBUTION SYSTEM AND METHOD

This is a continuation of U.S. application Ser. No. 10/398,275, filed on Apr. 4, 2003 now U.S. Pat. No. 7,707,253, under 35 USC 371, based on International Application PCT/JP02/07867 filed on Aug. 1, 2002 with a claim of priority benefit to Japanese Application No. 2001-239692 filed in Japan on Aug. 7, 2001, respectively, the entirety of which are hereby incorporated herein by reference.

TECHNICAL FIELD

This invention relates to an information distribution system, an information distribution method, an information supplying apparatus, an information supplying method, an information processing terminal and an information processing method. More particularly, it relates to an information distribution system and an information distribution method, in which data saved in an information supplying device can be modified in a portable communication terminal, an information supplying apparatus and an information supplying method, used for this information distribution system, and an information processing terminal and an information processing method, used in this information distribution system.

BACKGROUND ART

There are currently rendered services in which an image processing server is provided on a network, a picture is transiently uploaded to this image processing server, the uploaded picture is automatically transformed to have data volume or number of colors that can be dealt with by a portable information processing terminal, and in which the so transformed picture is downloaded to and used in the portable information processing terminal.

In these conventional services, however, since the portable information processing terminal, in particular the portable telephone set, has a limited image data processing ability, a problem is raised that only a processing device capable of performing highly advanced image data processing, such as a personal computer, can modify the uploaded image data.

Moreover, in the conventional information distribution system, the destination of information distribution needs to be directly input to the Web page downloaded from the image processing server. This inputting operation is, however, extremely cumbersome for the user.

DISCLOSURE OF THE INVENTION

In view of the this status of the art, it is an object of the present invention to provide an information distributing system and an information distribution method in which data saved in an information supplying device is browsed from a portable communication terminal and modified such that the data is in a state of re-transmission.

For accomplishing the above object, the present invention provides an information distribution system comprising a portable communication terminal having display means for displaying Web data including image data and text data and data transmitting/receiving means for transmitting/receiving the Web data, an information supplying device having data saving means for saving the Web data and information appending means for appending addresses for referencing the Web data from outside to the Web data and another portable communication terminal having data acquisition means for acquiring the Web data and display means for displaying the web data. The list information of the Web data formulated in the past is displayed on the display means of the portable communication terminal, the text data contained in the Web data referenced by the Web data selected from the list information of the Web data displayed is modified and a new address is appended to the modified Web data.

The present invention also provides an information distribution system for distributing Web data from a first information processing terminal to a second information processing terminal, comprising an information supplying device having data saving means for saving formulated Web data and information appending means for appending an address for the Web data for referencing the Web data from outside, and an information processing terminal having data acquisition means for acquiring the Web data having the address appended thereto, and display means for displaying the Web data. When a Web page is saved in the information processing terminal, the information supplying device transmits to the information processing terminal a command for booting a mail preparation screen with a URL (Uniform Resource Locator) of the Web page as an argument.

The present invention also provides an information distribution method comprising a first information processing step having a display step of displaying Web data including image data and text data and a data transmitting/receiving step of transmitting/receiving the Web data, an information supplying step having a data saving step of saving the Web data and an information appending step of appending an address for referencing the Web data from outside of the Web data, and a second information processing step having a data acquisition step of acquiring the Web data and a display step of displaying the web data. The text data contained in the Web data referenced by Web data selected from the list information of the Web data formulated in the past is modified, and a new address is appended to the as-modified Web data.

The present invention also provides an information distribution method for distributing Web data from a first information processing terminal to a second information processing terminal, comprising an information supplying step having data saving step for saving formulated Web data and information appending step for appending an address for the Web data for referencing the Web data from outside; and an information processing step having data acquisition step for acquiring the Web data having the address appended thereto, and display step for displaying the Web data. When a Web page is saved in the information processing step, the information supplying step transmits to the information processing step a command for booting a mail preparation screen with a URL (Uniform Resource Locator) of the Web page as an argument.

The present invention also provides an information supplying apparatus comprising data saving means for saving Web data having image data and text data, information appending means for appending to the Web data addresses for referencing the data from outside, and transmission means for transmitting to a portable communication terminal the list information of the Web data formulated in the past. The information appending means appends new addresses to new data including text data modified in the portable communication terminal.

The present invention also provides an information supplying method comprising a data saving step of saving Web data having image data and text data, an information appending step of appending to the Web data addresses for referencing the data from outside, and a transmission step of transmitting to a portable communication terminal the list information of the Web data formulated in the past.

The information appending step appends new addresses to new data including text data modified in the portable communication terminal.

The present invention also provides an information processing terminal comprising data transmitting/receiving means for transmitting/receiving the Web data, having a function of formulating a Web page using Web data including image data and text data and a "mail-to" function. On formulating a Web page, a mail preparation screen in the main text of which has been inserted a URL (Uniform Resource Locator) of the Web page is booted.

The present invention also provides an information processing method comprising a data transmitting/receiving step of transmitting/receiving the Web data, having a function of formulating a Web page using Eeb data including image data and text data and a "mail-to" function. On formulating a Web page, a mail preparation screen in the main text of which has been inserted a URL (Uniform Resource Locator) of the Web page is booted.

Other objects, features and advantages of the present invention will become more apparent from reading the embodiments of the present invention as shown in the drawings.

BRIEF DESCRIPTION OF THE DRAWINGS

FIG. 20 is a view showing an exemplary error message screen structure that is transmitted to a user's portable radio communication terminal in the information distribution system according to the present invention.

FIG. 26 is a view showing an exemplary transmission destination display screen that is transmitted to a user's portable radio communication terminal in still another exemplary information distribution system to which the present invention is applied.

BEST MODE FOR CARRYING OUT THE INVENTION

An information distribution system according to the present invention is a system which enables distribution of image data to a distribution recipient desired by a registered user by using an image data distribution function that is made available by making registration for use in advance. In the information distribution system to which the present invention is applied, data to be distributed is temporarily saved as data of a standard format, and when a transmission request is sent from a communication terminal at a distribution destination, the data can be converted to an optimum image data format in accordance with the communication terminal and then transmitted. Moreover, in this information distribution system, optimum content information can be distributed to a user and an information distribution recipient desired by the user, by using user registration information acquired when the user made registration in advance.

Hereinafter, an embodiment of the present invention will be described with reference to the drawings.

Figure 1:
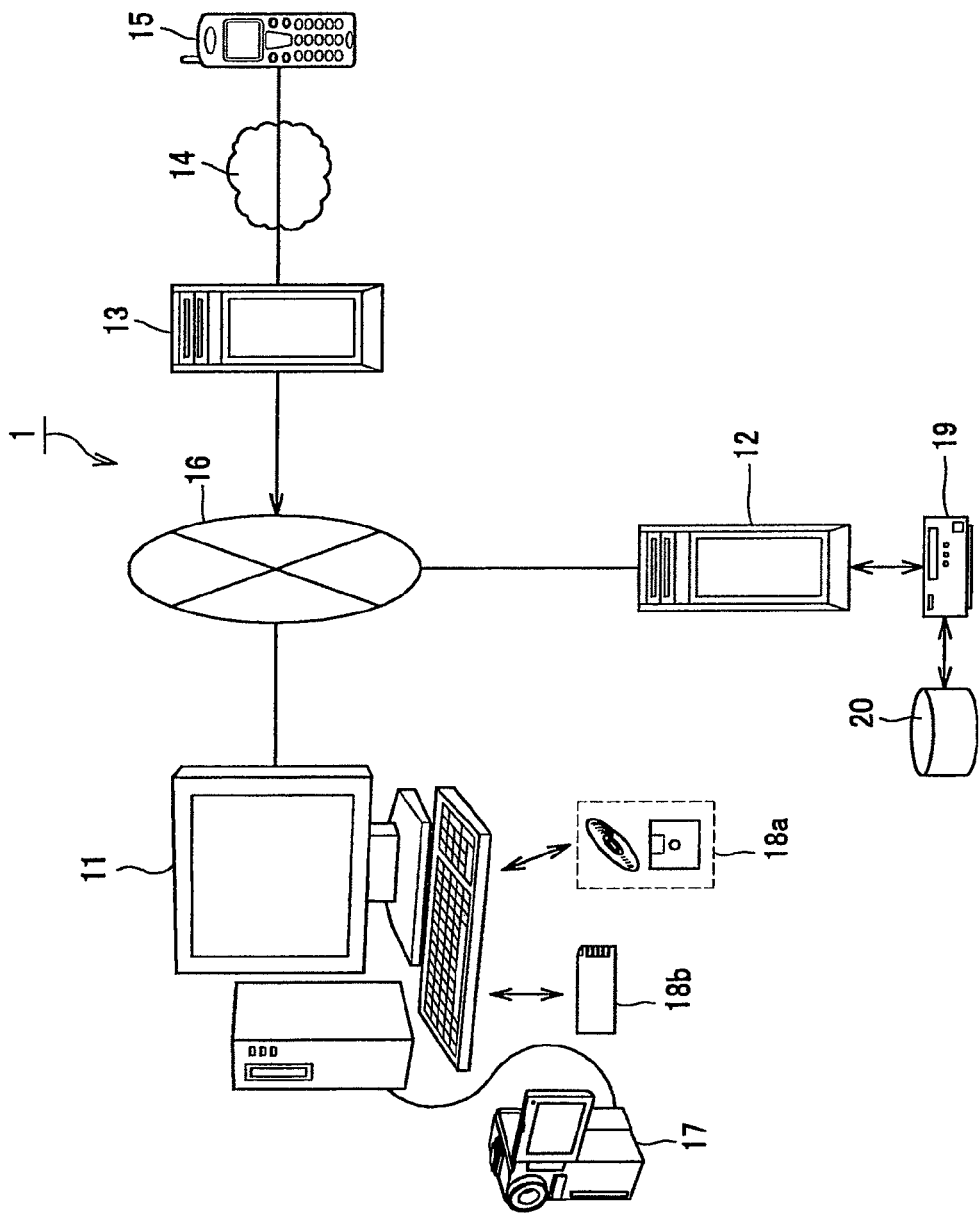
FIG. 1 is a structural view showing the schematic structure of an information distribution system to which the present invention is applied.

An information distribution system 1 to which the present invention is applied has an image data processing device 11 having an image data processing function and a communication function, a server 12 for storing image data transmitted from the image data processing device 11, and a portable telephone base station 13 connected with a portable telephone unit 15 through a portable telephone communication network 14, as shown in FIG. 1.

This is a system for distributing advertisement information using an image data distribution system in which the image data processing device 11, the server 12 and the portable telephone base station 13 constituting the information distribution system 1 according to the present invention are connected with each other through a wire network 16.

The wire network 16 is the so-called Internet. The portable telephone unit 15 is a portable telephone unit that can be connected to the wire network 16 via the portable telephone base station 13.

The image data processing device 11 is, for example, a personal computer capable of performing various image processing on image data by using software-based processing or a hardware structure. The image data processing device 11 can be connected with a digital image pickup device 17 such as a digital video camera or a digital still camera by using a general-purpose interface and can receive image data captured by the digital image pickup device 17. The image data processing device 11 also has driver units supporting a recording medium 18a such as an optical disc-like recording medium, typically, a CD (compact disc) or a DVD (digital versatile disc), or a magnetic recording medium, typically, an FD (flexible disk), and a semiconductor storage device 18b such as a flash memory (trademark registered) or a memory stick (trademark registered). The image data processing device 11 can read image data also from the recording medium 18a or the semiconductor storage device 18b.

In the above-described example, image data is temporarily read into the image data processing device 11. However, a system structure which does not include the image data processing device 11 is also possible. In this case, for example, a portable telephone unit is connected to the digital image pickup device 17 and image data is directly transferred to the portable telephone unit 15 at the distribution destination. Connecting the digital image pickup device 17 with the portable telephone unit is an example of measures for connecting the digital image pickup device 17 to the wire network 16, and a fixed telephone or the like may be used instead of the portable telephone unit. Alternatively, connection means to the wire network 16 may be provided in the digital image pickup device 17 itself. Moreover, the digital image pickup device 17 is not limited to a camera or a scanner and may be a PDA (personal digital assistant) with a built-in CCD (charge-coupled device) camera, or a portable telephone unit with a built-in CCD camera.

The image data processing device 11 reads image data from the digital image pickup device 17, the recording medium 18a or the semiconductor storage device 18b, and converts the image data to image data of a standard format. Conversion to image data of a standard format can be carried out using dedicated conversion software that is distributed by a provider providing this information distribution system. Image data of a standard format is image data having a data quantity, an image data file format and the like that can be processed at the portable telephone unit 15. The "standard format" in this case means "standard" in an image data distribution system as a basis of the information distribution system of this specific example. In this specific example, in order to minimize deterioration of image data and data loss, image data using a GIF (Graphics Interchange Format) file format of reversible compression and having a data quantity of 10 kilobytes or less is used.

In the information distribution system 1, since image data is converted to a predetermined format in advance to limit the data quantity and then transmitted to the server 12, the connection time is reduced when transmitting the image to the server. Moreover, the capacity of the server 12 can be saved.

However, with respect to the image data file format, the image size and the data quantity to be employed for standard image data, various options are possible, for example, conforming to the standard defined by the majority of telephone companies, of plural telephone companies providing potable telephone services.

Using the image data processing device 11, a user converts desired image data to image data of the above-described standard format and prepares text data which the user wants to attach to the image data. The image data processing device 11 prepares image/text data including the image data and the text data, using the conversion software. The image/text data is described, for example, as Web page data of the part/form-data format. This image/text data is transmitted to the server 12.

The server 12 is connected with an authentication server 19 for saving authentication ID and password for authenticating whether or not a person accessing the server 12 via the wire network 16 is a user who has registered for using the image data distribution system, and a user information database 20 in which user information of registered users is stored.

As a method for authenticating a user, for example, authentication ID and password, issued in advance at the time of registration by the service provider of the image data distribution system to a user who registered for service use, may be authenticated at the time of access.

As a method for user registration, for example, necessary items may be entered on a Web page sent from the server to a personal computer or the like via the wire network 16, or the digital image pickup device 17 to which an application form for user registration is attached may be sold. Alternatively, a user may apply for user registration by telephone or mailing an application postcard. When a user registers, user information of the user who wants to be registered is acquired. As registration for use is completed, authentication ID and password are sent to the user from the service provider, for example, by mail or facsimile.

Figure 2:
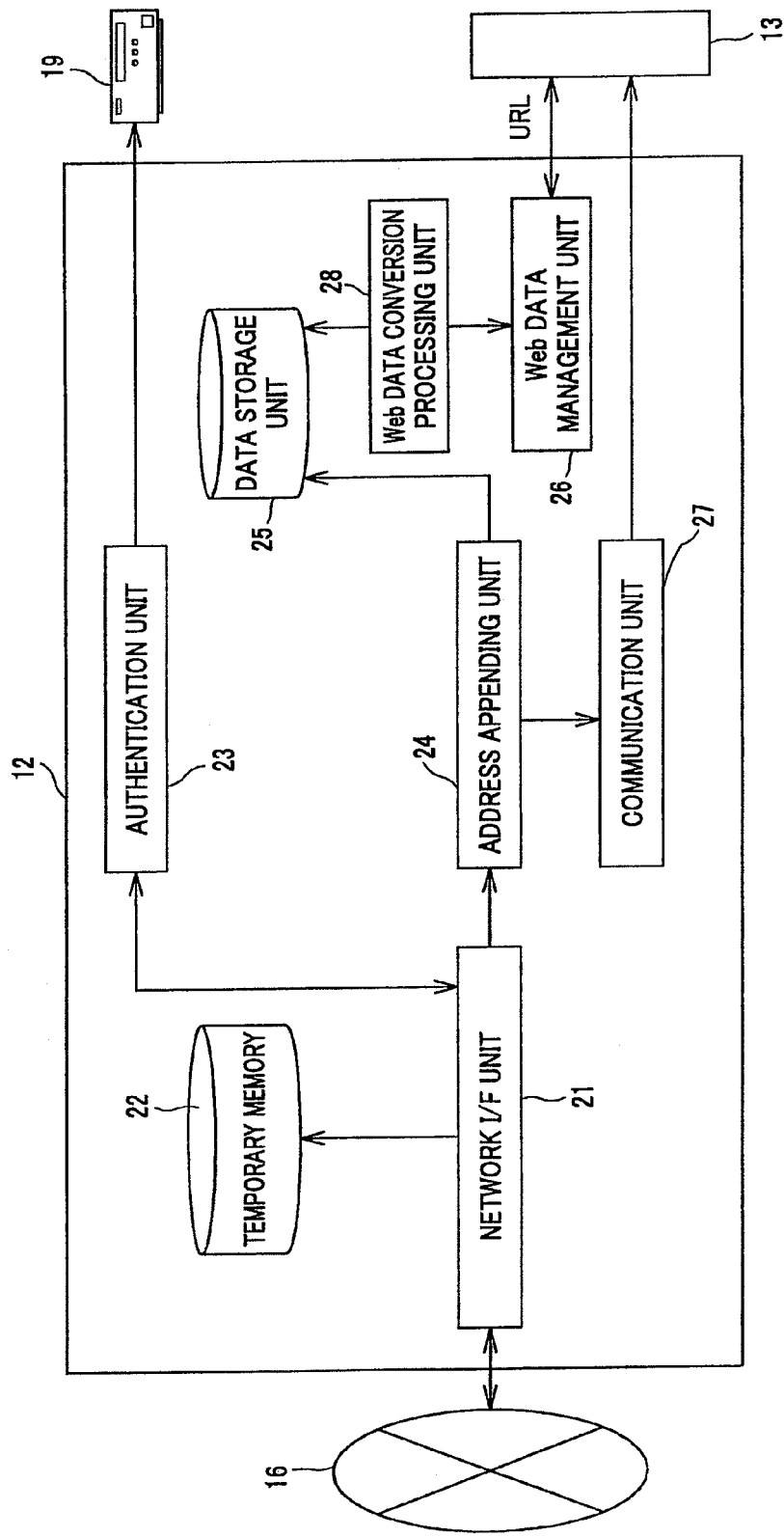
FIG. 2 is a structural view for explaining the structure of a server in the information distribution system according to the present invention.

The server 12 has the following units as shown in FIG. 2: a network interface unit (hereinafter referred to as network I/F unit) 21 for receiving image data, authentication ID and password transmitted thereto via the wire network 16; a temporary memory 22 for temporarily saving the received data; an authentication unit 23 for checking the received authentication ID and password with authentication data saved in the authentication server 19; an address appending unit 24 for appending, to image/text data sent from a user, a URL (uniform resource locator) as a destination address indicating the storage position in a data storage unit 25; the data storage unit 25 for storing the image/text data; a Web data management unit 26 for managing communication with the portable telephone unit 15; a communication unit 27 for transmitting the URL indicating the saving location where the image data is stored, to a distribution destination designated by the user for distribution of the image data; and a Web data conversion processing unit 28 for converting Web data to be transmitted, in accordance with the terminal at the distribution destination. These units are integrally controlled by a control unit, not shown.

In this specific example, image/text data is converted to Web page data of the multipart/form-data format by the image data processing device 11 and then transmitted to and received by the server 12. Then, the Web page data is converted to data of the HTML (Hypertext Markup Language) format or the like.

However, the data format when data is stored in the data storage unit 25 of the server 12 is not particularly limited. For example, data of the multipart/form-data format may be stored. Alternatively, image data and text data of image/text data may be separated, and for the text data, for example, title data, text content data and the like can be separately stored. In the case of separately storing data, when sending the data to the portable telephone unit 15 at the distribution destination, the separate data are reassembled and then transmitted on the basis of the data format such as the HTML format. Separately storing respective data of image/text data is advantageous in that the efficiency of conversion processing in the case of conversion to an optimum data format for the portable telephone unit of the distribution destination is improved.

Figure 3:
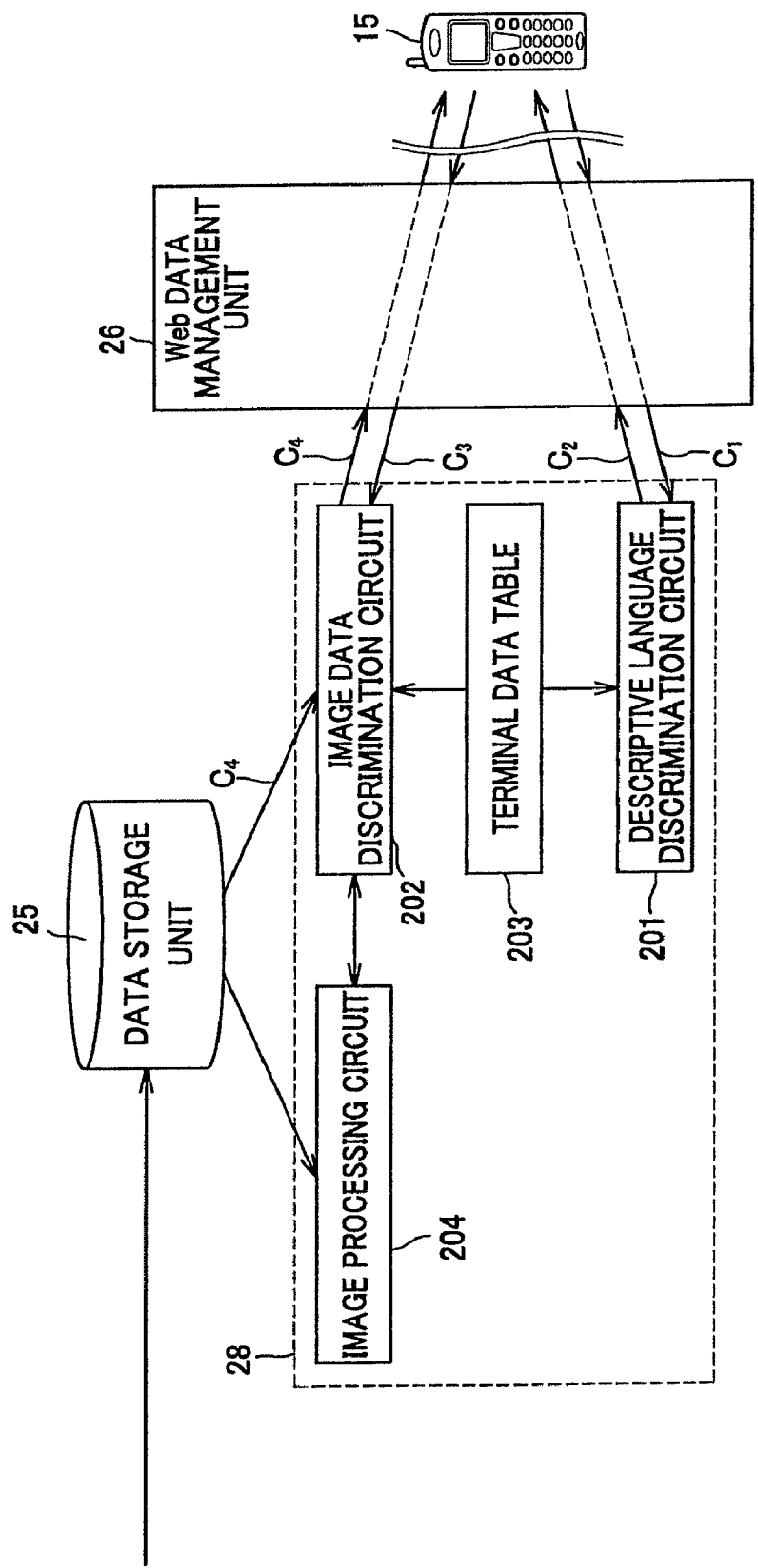
FIG. 3 is a structural view for explaining the structure of a Web data conversion processing unit in the information distribution system according to the present invention.

The Web data conversion processing unit 28 is specifically a CGI (common gateway interface) for using an external program in the server 12. As shown in FIG. 3, the Web data conversion processing unit 28 has a descriptive language discrimination circuit 201 for discriminating the descriptive language of Web data used by the portable telephone unit 15 at the distribution destination, an image data discrimination circuit 202 for discriminating the image data format of the portable telephone unit 15 at the distribution destination, a terminal data table 203 in which the machine type of the terminal and the standard of image data are stored as a table, and an image processing circuit 204 for performing image processing corresponding to the results of the discriminations by the descriptive language discrimination circuit 201 and the image data discrimination circuit 202.

On receiving a text data request signal C1 from the portable telephone unit 15, the descriptive language discrimination circuit 201 determines the communication service provider and the machine type of the terminal from this signal, then extracts a descriptive language corresponding to the result of the discrimination from the terminal data table 203, converts text data to this format, and transmits a test data response signal C2. The descriptive language may be, for example, the HTML (Hypertext Markup Language) format or HDML (handheld Device Markup Language) format or the like.

On receiving an image data request signal C3 from the portable telephone unit 15, the image data discrimination circuit 202 determines the communication service provider and the machine type of the terminal from this signal, then extracts an image data format corresponding to the result of the discrimination from the terminal data table 203, converts image data to this image data format, and transmits an image data response signal C4. Here, the image data file format such as GIF format or PNG format, the designated pixel size and the like are collectively referred to as image data format.

In this specific example, image data from a user, which has already been converted to the standard of a predetermined communication service provider A, that is, GIF format, with a data quantity of 10 kilobytes or less in the image data processing device 11 as described above, is transmitted and saved in the data storage unit 25.

Figure 4:
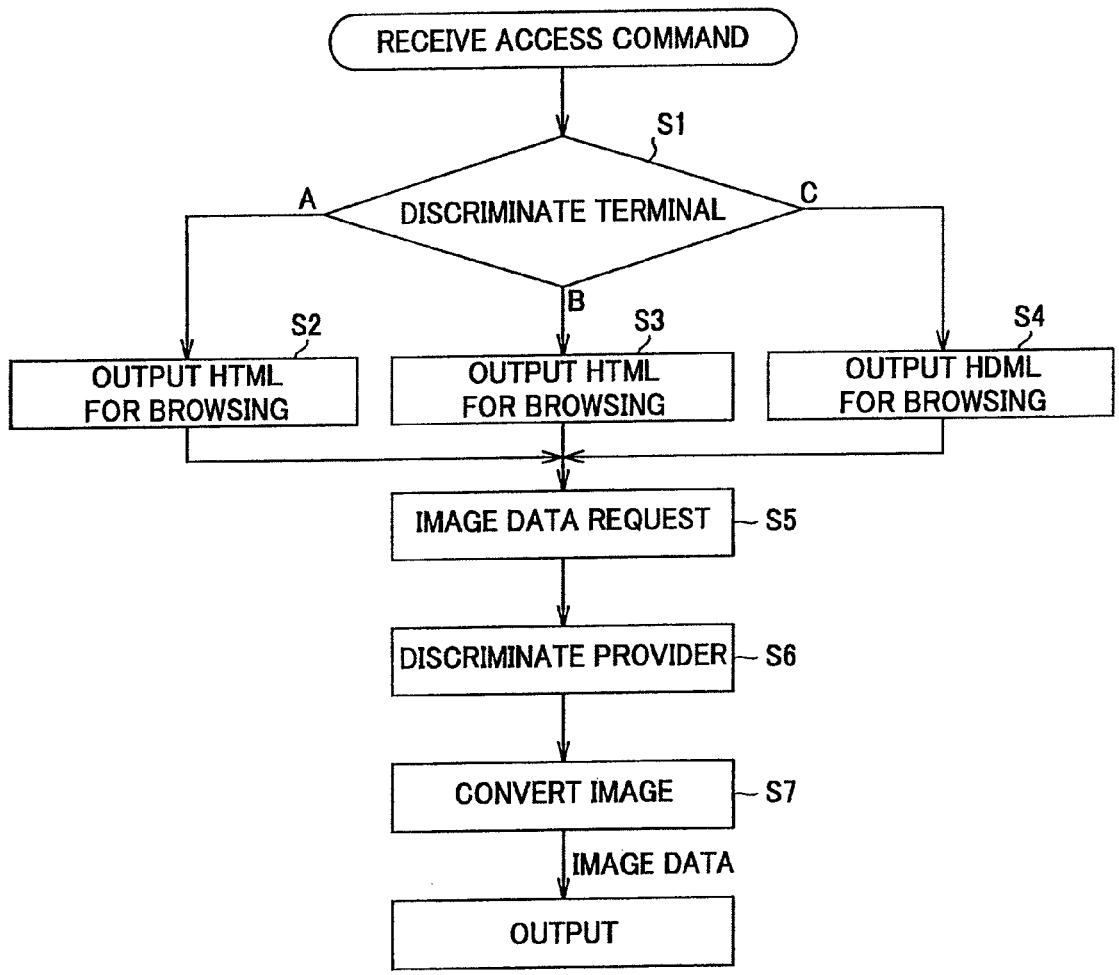
FIG. 4 is a flowchart for explaining the processing to convert image data and a descriptive language contained in Web data in the information distribution system to which the present invention is applied.
Figure 5:
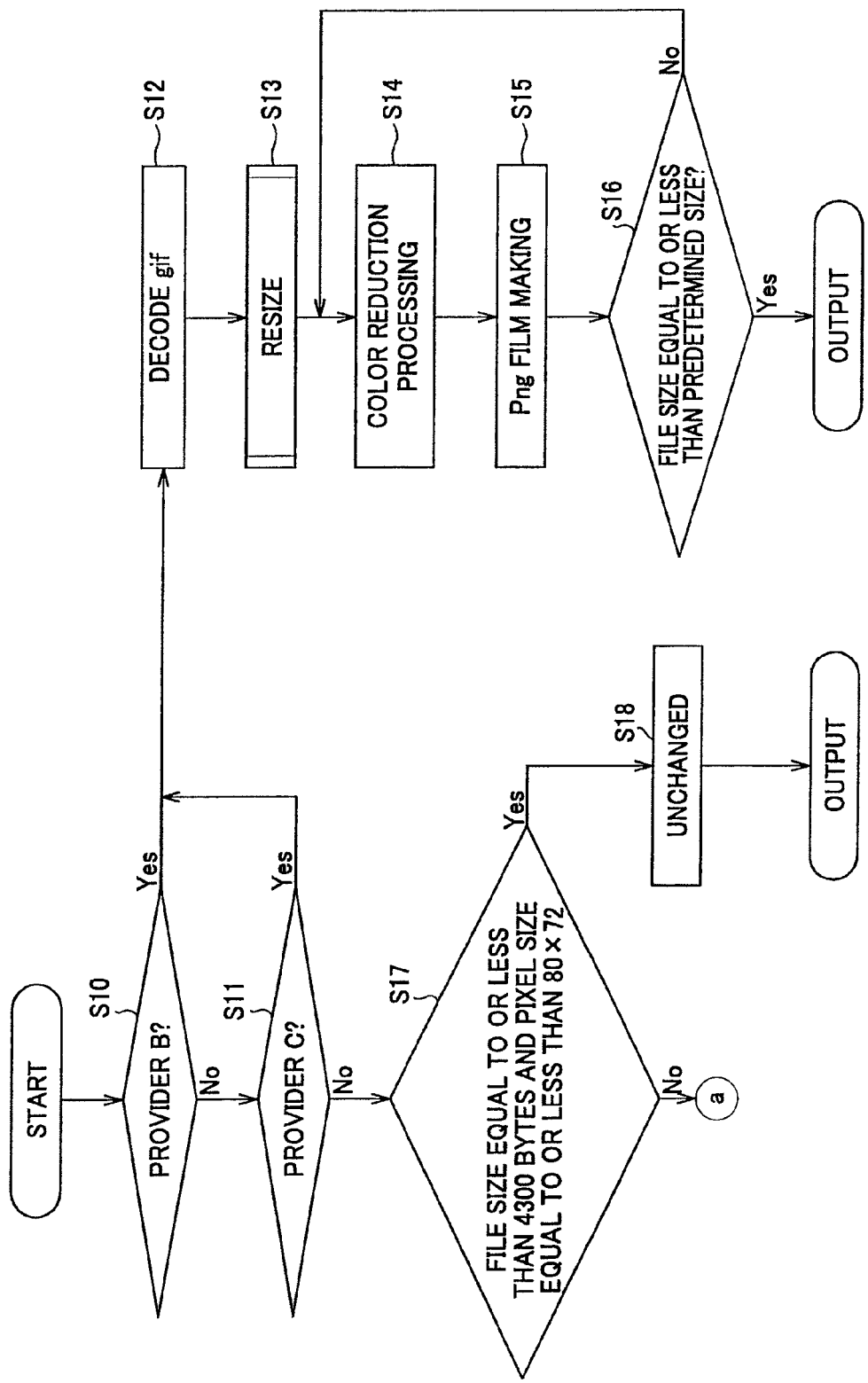
FIG. 5 is a flowchart for explaining image data discrimination processing in the information distribution system according to the present invention.

The processing to convert the image data and the descriptive language contained in the Web data of the Web data conversion processing unit 28 will now be described with reference to FIG. 4. In this specific example, it is assumed that there are three communication service providers A, B and C. The information distribution system 1 discriminates the difference in standard between these three communication service providers, then converts image/text data to optimum image/text data for each portable telephone unit, and transmits the optimum image/text data.

As the server 12 receives an access command (text data request signal) from a certain portable telephone unit, the Web data conversion processing unit 28 at step S1 discriminates the communication service provider, as the processing within the server 12.

If the service provider is the provider A, the descriptive language discrimination circuit 201 at step S2 transmits Web data as data of the HTML format. If the service provider is the provider B, the descriptive language discrimination circuit 201 at step S3 transmits Web data as data of the HTML format. If the service provider is the provider C, the descriptive language discrimination circuit 201 at step S4 transmits Web data as data of the HDML format.

As the text data of the HTML or HDML format is transmitted to the potable telephone unit, the portable telephone unit at step S5 sends an image data request signal.

The image data discrimination circuit 202 of the Web data conversion processing unit 28 discriminates the communication service provider and the machine type of the terminal (step S6). The image data is converted to an image data format extracted from the supporting table stored in the terminal data table 203 (step S7) and the converted image data is outputted.

The above-described series of processing in the Web data conversion processing unit 28 may be executed using software. Alternatively, it can be executed by the control unit of the server 12.

The discrimination of image data will be described further in detail with reference to FIGS. 5 to 8. In the discrimination of the terminal at step S1 of FIG. 4, if the portable telephone unit which transmitted an access command to the server 12 is of the provider B or the provider C, whether it is the provider B is discriminated at step S10 and whether it is the provider C is discriminated at step S11. If it is the provider B or the provider C, the processing goes to step S12 and the image data of the GIF format, of the image/text data, is decoded. At step S13, resizing processing is carried out. The resizing processing will be later described in detail.

Next, in order to make the file size equal to or less than a predetermined file size, color reduction processing and PNG file processing are carried out at steps S14 and S15. At step S16, whether the file size is not larger than the predetermined file size is discriminated. If the file size is not within the predetermined range, the steps S14 and S15 are repeated. If the file size of the image/text data is within the predetermined range, the data is outputted to the portable telephone unit.

On the other hand, if it is determined at step S11 that the portable telephone unit is conformable to none of the standards of the providers A, B and C, whether the standard of image data of this portable telephone unit prescribes, for example, a file size of 4.3 kilobytes or less and a pixel size of 80×72 or less is discriminated at step S17. If it is conformable to these sizes, the image data format of the image data saved in the data storage unit 25 is left unmodified and the image data is outputted as it is at step S18. The standard of image data prescribing a file size of 4.3 kilobytes or less and a pixel size of 80×72 or less enables the image data to be displayed on any portable telephone unit conformable to the standard of the provider A.

Figure 6:
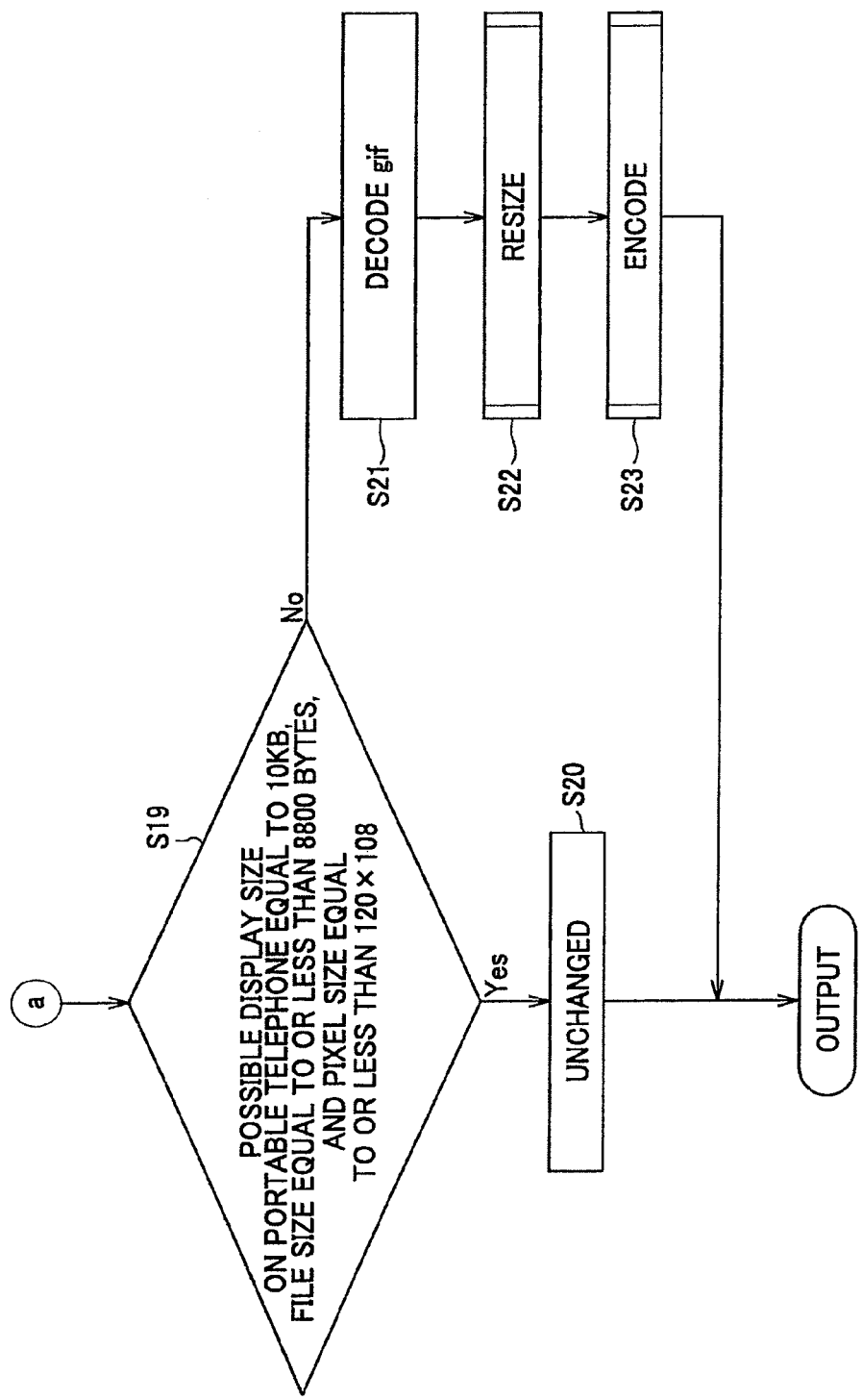
FIG. 6 is a flowchart for explaining image data discrimination processing in the information distribution system according to the present invention.

If it is determined at step S17 that the standard does not prescribe a file size of 4.3 kilobytes or less and a pixel size of 80×72 or less, it is discriminated at step S19 of FIG. 6 whether a possible display size on the portable telephone unit is 10 kilobytes and the file size of the image data is 8.8 kilobytes or less and the pixel size is 120×108 or less. If these conditions are met, the image data format of the image data stored in the data storage unit 25 is left unmodified and the image data is outputted as it is at step S20.

If the conditions of the possible display size on the portable telephone unit of 10 kilobytes, the file size of the image data of 8.8 kilobytes or less and the pixel size of 120×108 or less are not met, decoding from the GIF format is carried out at step S21, and resizing processing to support this image data is carried out at step S22. At step S23, the resized image data is encoded to the GIF format and then outputted.

Figure 7:
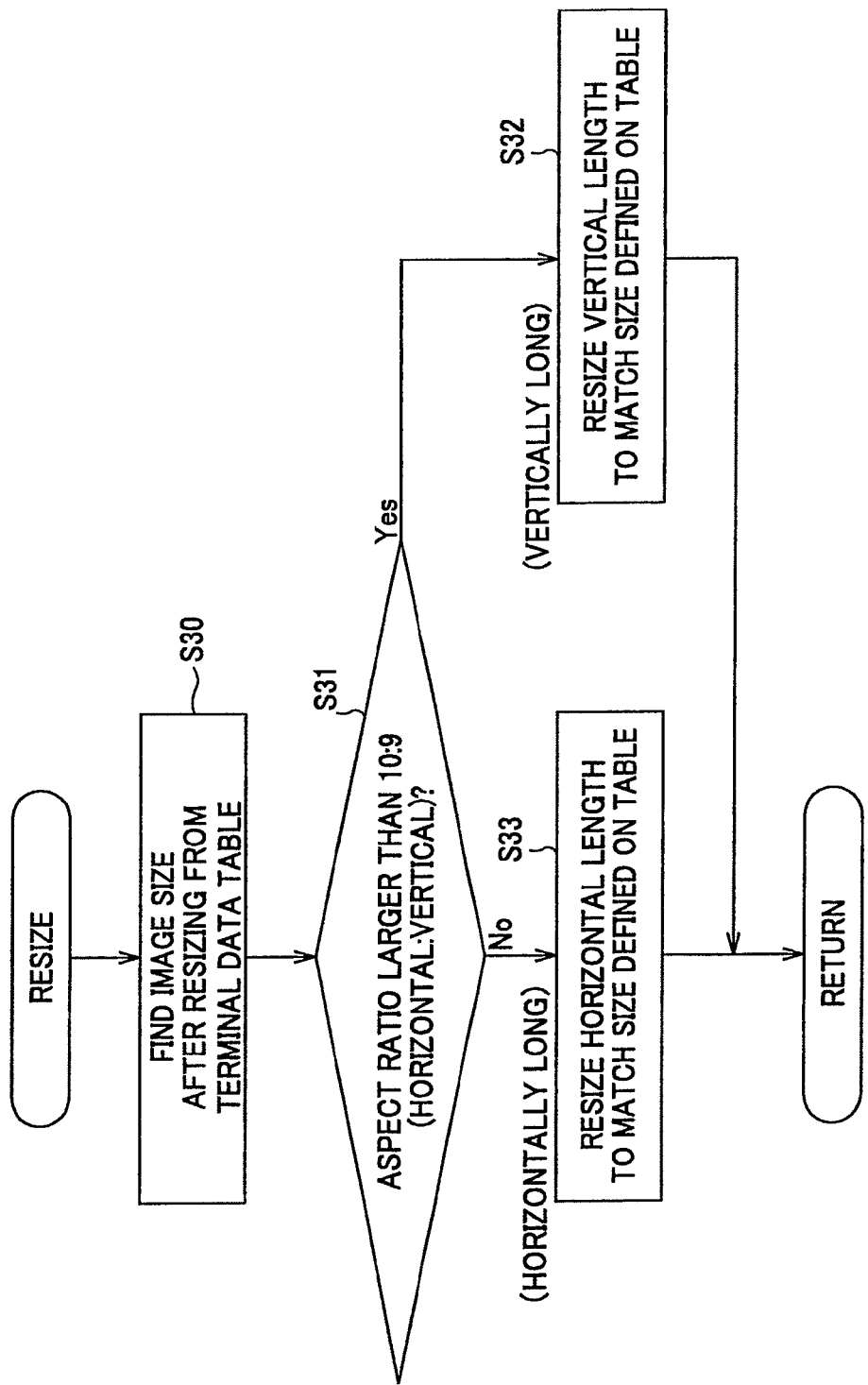
FIG. 7 is a flowchart for explaining resizing processing in the image data discrimination processing of the information distribution system according to the present invention.

FIG. 7 shows the above-described resizing processing. At step S30, the image data discrimination circuit 202 extracts the image frame size of image data after resizing, from the terminal data table 203.

Next, at step S31, the aspect ratio of the image data is discriminated. If the aspect ratio is larger than 10:9 (horizontal:vertical), at step S32, the vertical length of the image data is resized to the data size defined on the terminal data table 203. If the aspect ratio is smaller than 10:9 (horizontal:vertical), the horizontal length of the image data is resized to the data size defined on the terminal data table 203. The aspect ratio 10:9 (horizontal:vertical) of the image data in this case is the aspect ratio of image data saved in the data storage unit 25.

Figure 8:
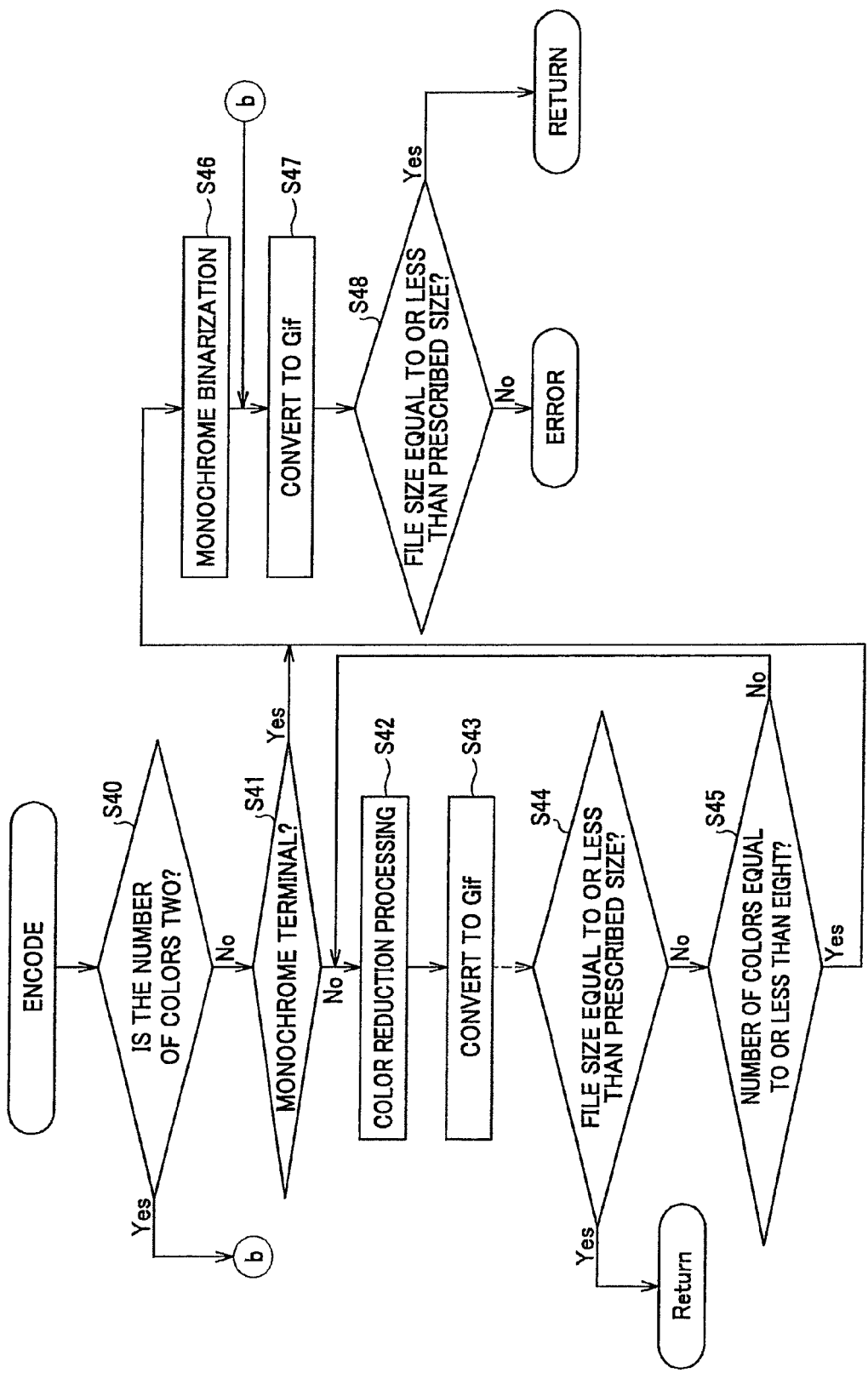
FIG. 8 is a flowchart for explaining encoding processing in the image data discrimination processing of the information distribution system according to the present invention.

FIG. 8 shows the encoding processing. In the encoding processing, first, the number of colors is discriminated at step S40. If the number of colors is two, the processing goes to step S47 subsequent to "b". If the number of colors is not two, whether or not the portable telephone unit is of a monochrome display type is discriminated at step S41. If the portable telephone unit is of a monochrome display type, the processing goes to step S46, which will be described later.

If the portable telephone unit is not a monochrome display-type terminal, color reduction processing of the image data is carried out at step S42 and the image data is converted to the GIF format at step S43.

At step S44, whether or not the file size is equal to or less than a prescribed size is discriminated. If the file size is equal to or less than the prescribed size, the processing returns to FIG. 6. If the file size is larger than the prescribed size, whether or not the number of colors is equal to or less than eight is discriminated at step S45. If the number of colors is not equal to or less than eight, the processing returns to step S42 and the color reduction processing is carried out. If the number of colors is equal to or less than eight, the processing goes to step S46 and monochrome binarization is carried out. Next, the image data is converted to the GIF format at step S47 and the file size is confirmed at step S48. If the file size is equal to or less than a prescribed value, the processing returns to FIG. 6. If a file size equal to or less than the prescribed value cannot be obtained even after executing the series of processing, error processing starts.

In the above-described information distribution system, image data is automatically converted to an image data file format supporting the image display standard of a portable telephone unit at a distribution destination of the image data and then outputted thereto. Because the standard of the image data format of the communication service provider A is adopted in this specification, as a standard image data format saved in the data storage unit 25, it may not be necessary to carry out image data conversion processing with respect to portable telephone units which receive communication services from the provider A. Therefore, there is an advantage that the processing is simplified.

Conventionally, each communication service provider has poor data compatibility and therefore sources must be provided for respective communication service providers in accordance with data to be distributed to a portable telephone unit. However, in the information distribution system 1, which has embodied the present invention, data can be automatically converted to a data file format supporting the image display standard of a portable telephone unit at a distribution destination of the data and then outputted. Therefore, it suffices to provide one source and the system is simplified, improving the advantage in cost of system design and system construction.

The information distribution system according to the present invention can provide common content information distribution services to portable telephone units of different communication service providers, by employing the terminal discrimination as described above.

Now, distribution of optimum content information to a registered user and a recipient desired by the user, using an information distribution system 2 as another specific example of the present invention, will be described. In this specific example, content information is particularly advertisement information. In this case, advertisement information as content information includes image information including dynamic images and still images, audio information, character information and the like. That is, the following specific example is an advertisement information distribution system utilizing the information distribution system 1.

The information distribution system 2 in this example has a similar structure to that of the information distribution system 1 shown in FIG. 1. Therefore, constituent elements having the same functions and effects are denoted by the same numerals and will not be described further in detail.

The information distribution system 2 is characterized in that an advertisement information storage unit 29 for storing advertisement information and an advertisement information appending unit 30 for selecting and attaching advertisement information to image/text data are provided in a server 12. However, in the structure of the server 12, the advertisement information storage unit 29 need not be constituted as a part of the server 12. The position of the advertisement information appending unit 30 is not particularly limited.

Specifically, when preparing a Web page containing advertisement information, an address indicating the storage location may be appended to image/text data transmitted from an image data processing device 11 of the user and having advertisement information appended thereto, and the resulting image/text data may be stored in a data storage unit 25. Alternatively, image/text data transmitted from the image data processing device 11 may be stored in the data storage unit 25, and when distributing this image/text data, advertisement information may be appended to the image/text data and thus transmitted.

The flow of distribution of advertisement information in the information distribution system 2 as a specific example of the present invention will now be described with reference to FIG. 10.

Figure 11:
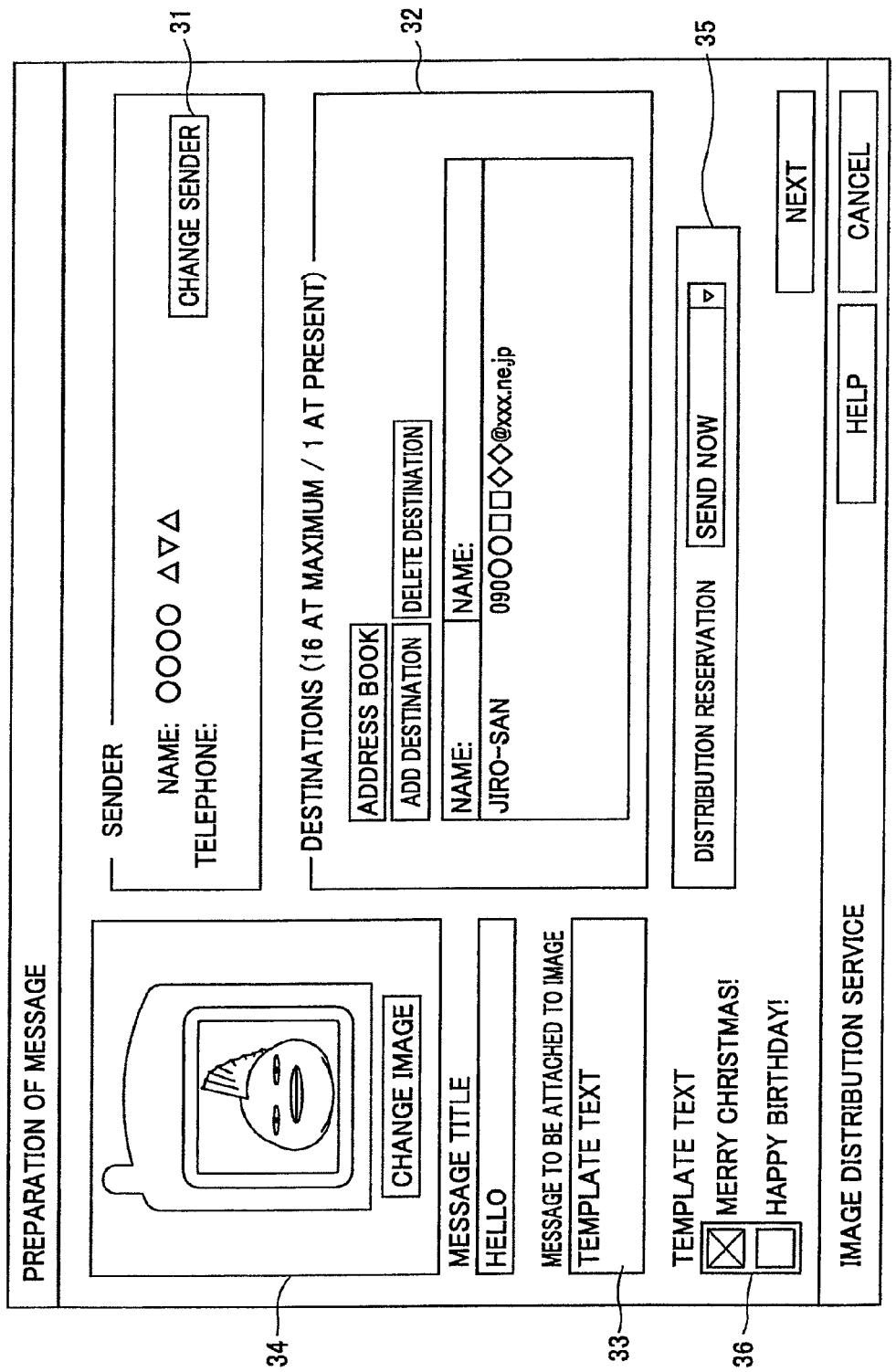
FIG. 11 is a view showing an exemplary image data processing GUI screen of an image data processing device in the information distribution system to which the present invention is applied.

First, the user prepares image/text data for distribution from desired image data and text data, using the image data processing device 11. FIG. 11 shows an exemplary GUI (graphical user interface) used as an image/text data preparation screen in the image data processing device 11 in this case.

On the GUI shown in FIG. 11, a sender change button 31 for switching to an input screen for inputting and/or changing the sender, a display section 32 for displaying the destination of distribution, an input section 33 for inputting a message to be attached to image data, and an image display section 34 for carrying out image display and image change are displayed. In addition to these, a distribution reservation section 35 for designating distribution timing, for example, whether data should be distributed right now or not, and a check box 36 for selecting a desired text from prepared template text options are displayed. The user edits image/text data which the user wants to distribute, on the GUI screen shown in FIG. 11.

When the user connects to the server 12 and transmits authentication ID and password that have been issued to the user in advance, the server 12 discriminates whether the user has been registered or not and authenticates the user.

After confirming that the user has been registered, the server 12 receives the image/text data, attaches advertisement information 90 based on user information to a confirmation notification (hereinafter referred to as result of transmission) to the effect that the image/text data has been received, and transmits the result of transmission to the user who sent the image/text data.

Figure 12:
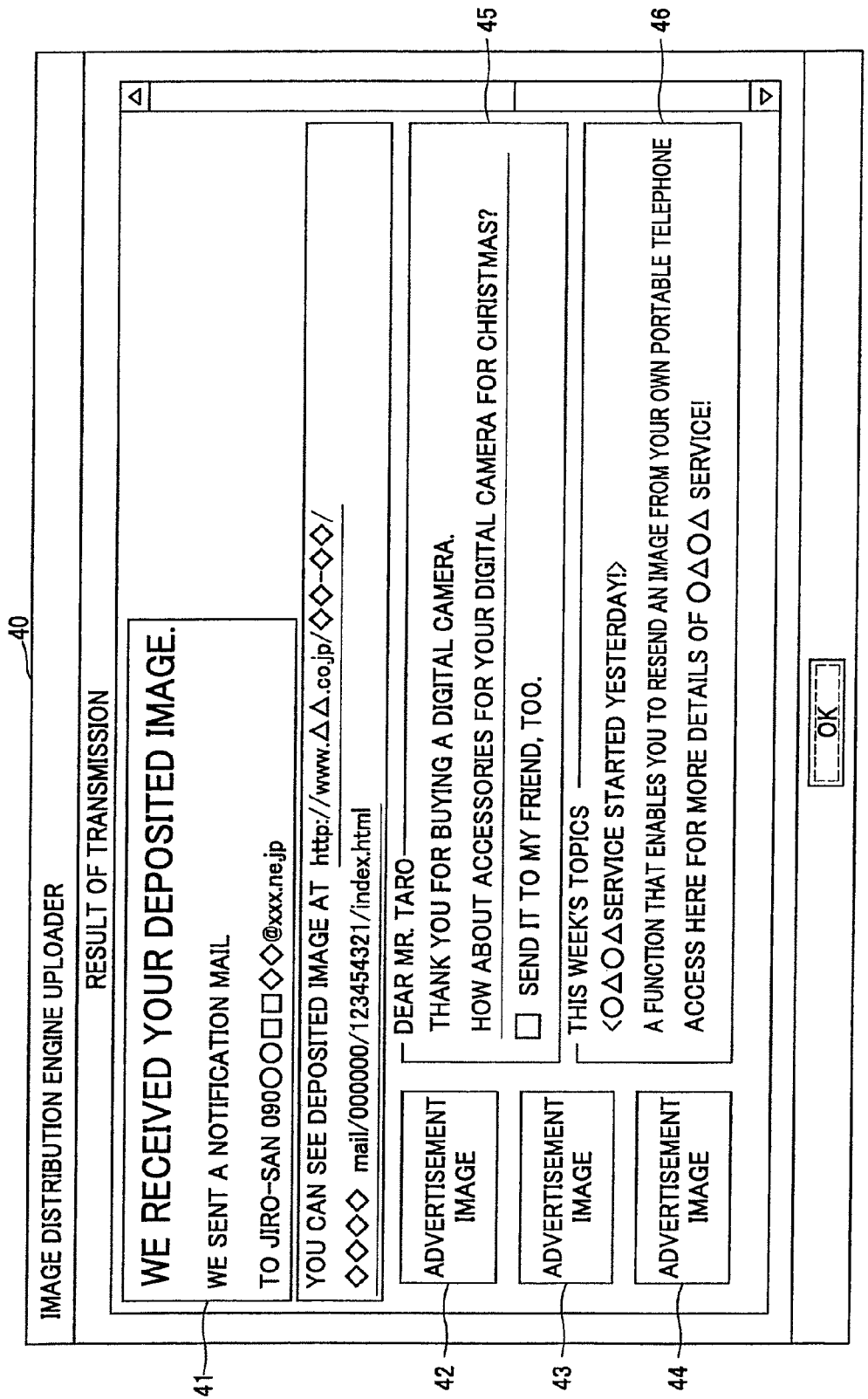
FIG. 12 is a view showing an exemplary image data processing GUI screen of the image data processing device in the information distribution system to which the present invention is applied.

FIG. 12 shows a Web screen transmitted as the result of transmission. In the result of transmission 40, a notification 41 to the effect that image/text data has been deposited is displayed, and an advertisement image 42, an advertisement image 43, an advertisement image 44, a text advertisement with a check box 45, and a text advertisement 46 are attached thereto. The attached advertisement information in this case is based on the user information. For example, the advertisement information includes advertisements of goods based on the gender and age of the user, advertisements of peripheral equipments of the digital image pickup device 17 and the personal computer owned by the user, and advertisements of goods based on the user's record of past purchase of goods.

In this case, the text advertisement with a check box 45 includes a check box for designating to "send it to my friend, too". If this check box is checked, a similar advertisement is attached to image/text data to be distributed to a recipient. In the information distribution system 2, if a template text prepared by the provider is selected as in the check box 36 or the text advertisement with a check box 45, advertisement information of a content related to the template text selected in the check box can be efficiently transmitted to a recipient, interlocked with this item. Moreover, by providing advertisement information that can be selected in accordance with a recipient to which the user wants to distribute image/text data, as in the text advertisement with a check box 45, information can be shared by the user and the distribution recipient.

Figure 10:
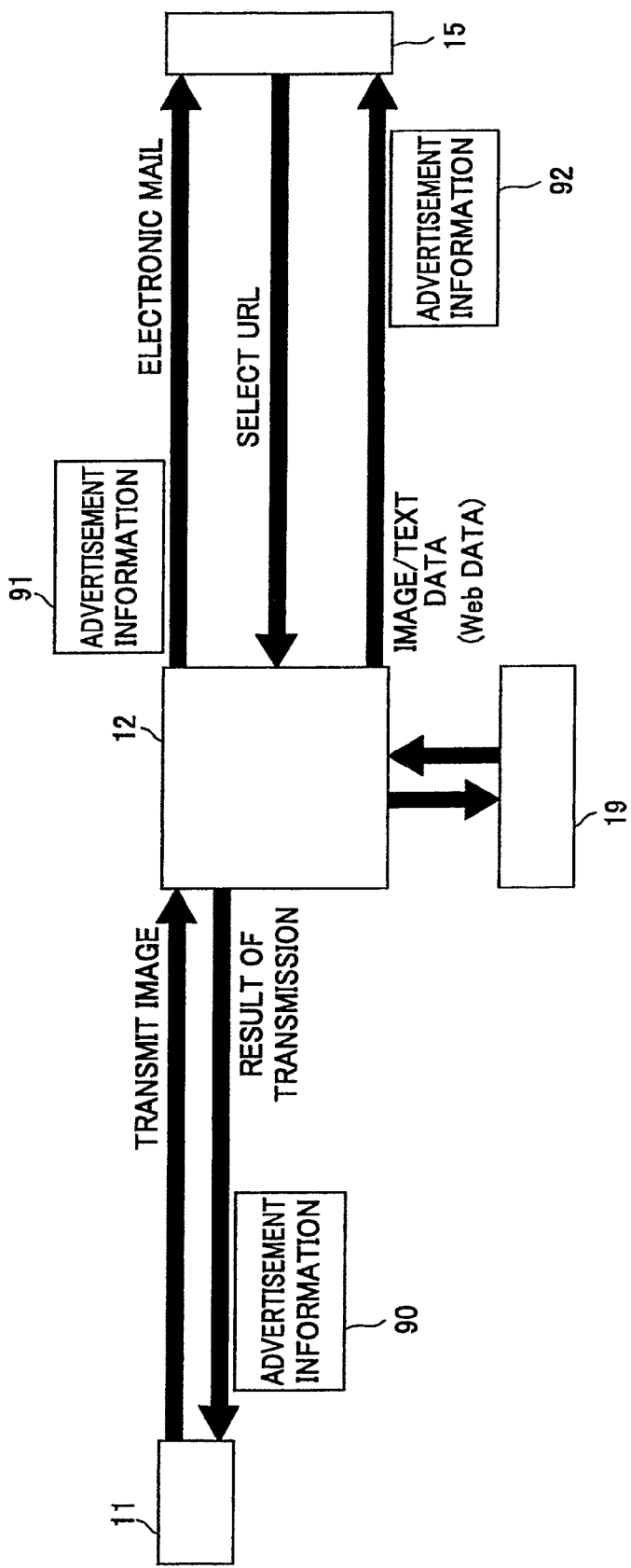
FIG. 10 is a schematic view for explaining the processing to append advertisement information in the information distribution system according to the present invention.

When the latest image/text data is transmitted from the user, the server 12 transmits a notification of image deposit including advertisement information 91 to the portable telephone unit 15 of the distribution recipient, as shown in FIG. 10.

Figure 9:
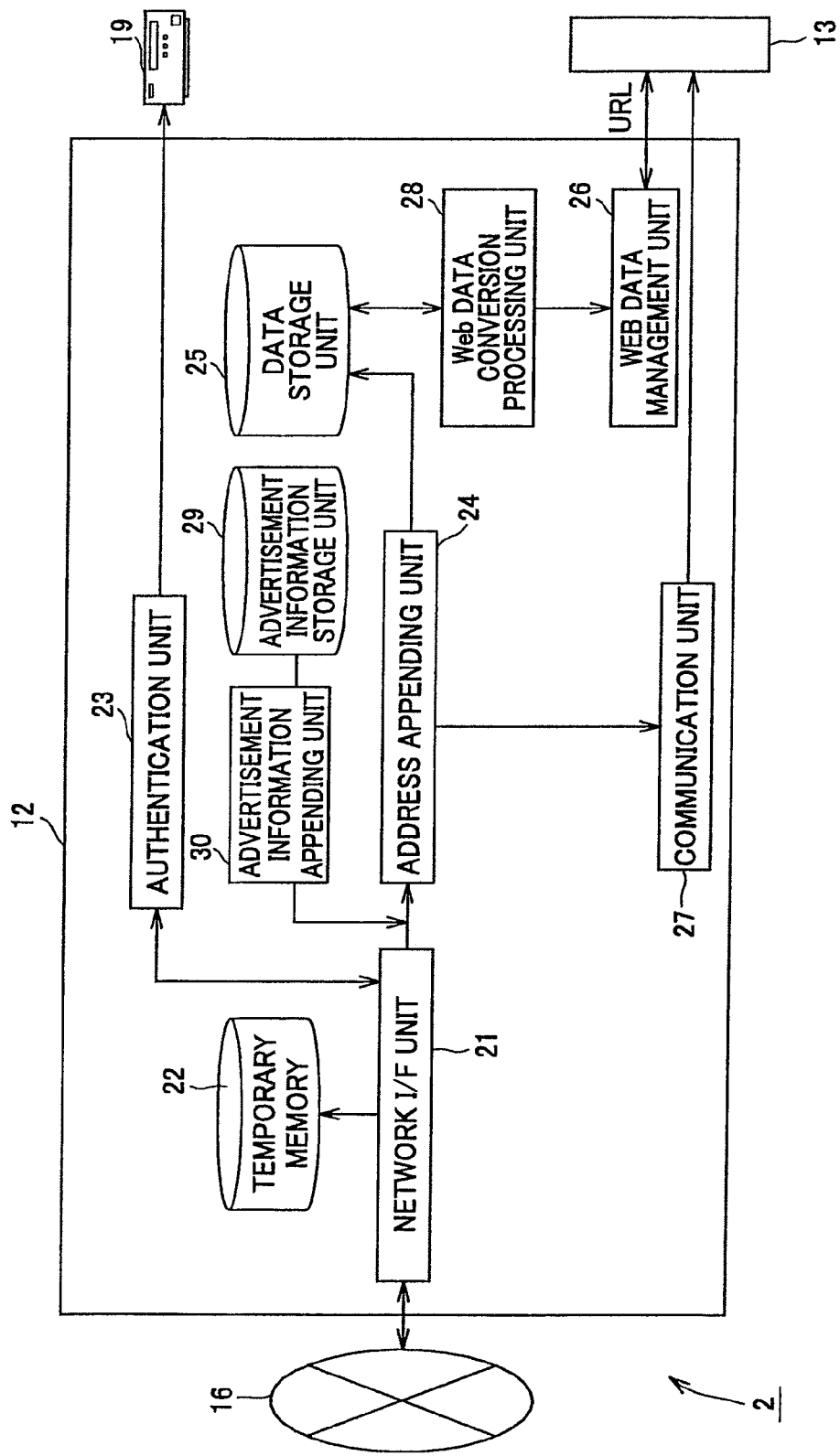
FIG. 9 is an explanatory view for explaining the structure of the server in the information distribution system to which the present invention is applied.
Figure 13:
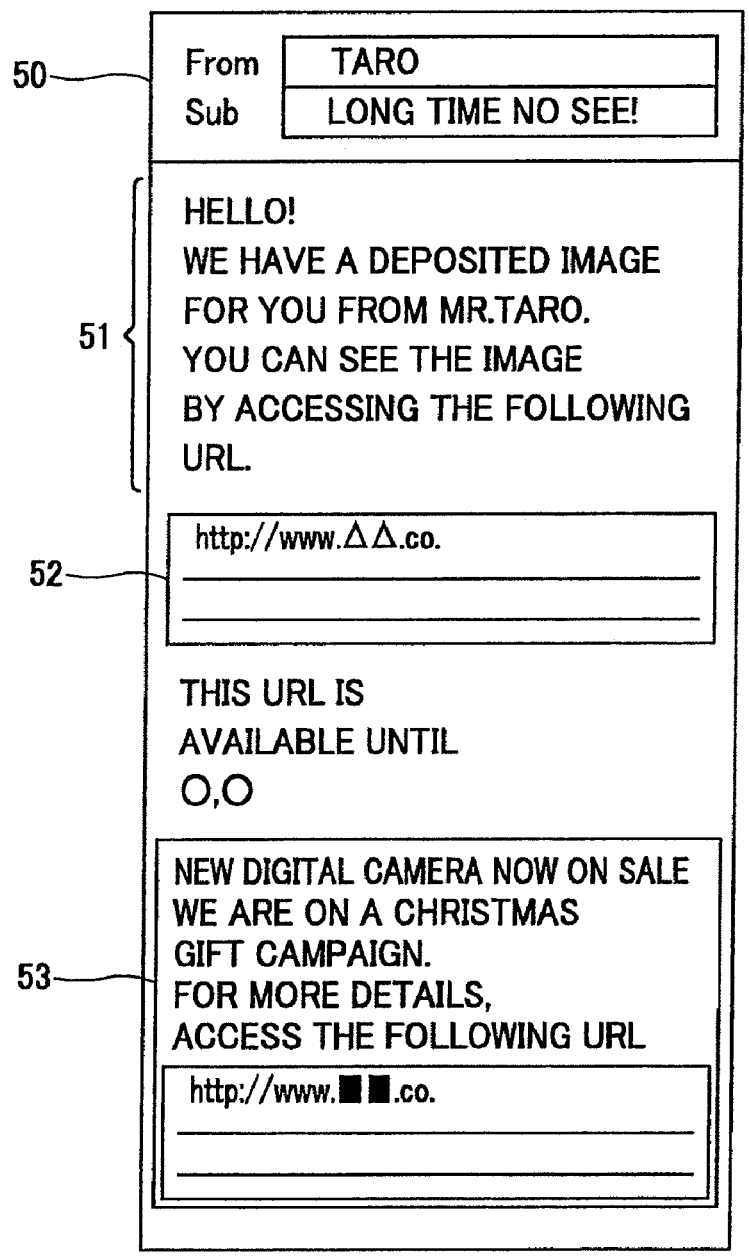
FIG. 13 is a view showing an exemplary screen structure that is transmitted to a portable radio communication terminal at a destination in the information distribution system according to the present invention.

FIG. 13 shows a deposit notification screen transmitted to the portable telephone unit 15 of the recipient. On a deposit notification screen 50, a message 51 to the effect that image/text data has been deposited from the user, and an URL 52 for viewing image/text data saved in the server 12 are displayed. Furthermore, a character advertisement 53 is attached to the deposit notification screen 50. This URL is a URL attached by the address appending unit 24 shown in FIGS. 2 and 9 and indicating the recording position of the image/text data in the data storage unit 25.

Moreover, a URL 54 indicating a Web page showing a detailed advertisement can be appended to the character advertisement 53. The distribution recipient can proceed to the Web page showing the detailed text advertisement, by selecting the URL 54.

By operating the portable telephone unit 15 to select the URL 52, the distribution recipient acquires the image/text data sent from the user using the portable telephone unit 15, as a Web page. As shown in FIG. 10, this Web page contains advertisement information 92.

Figure 14:
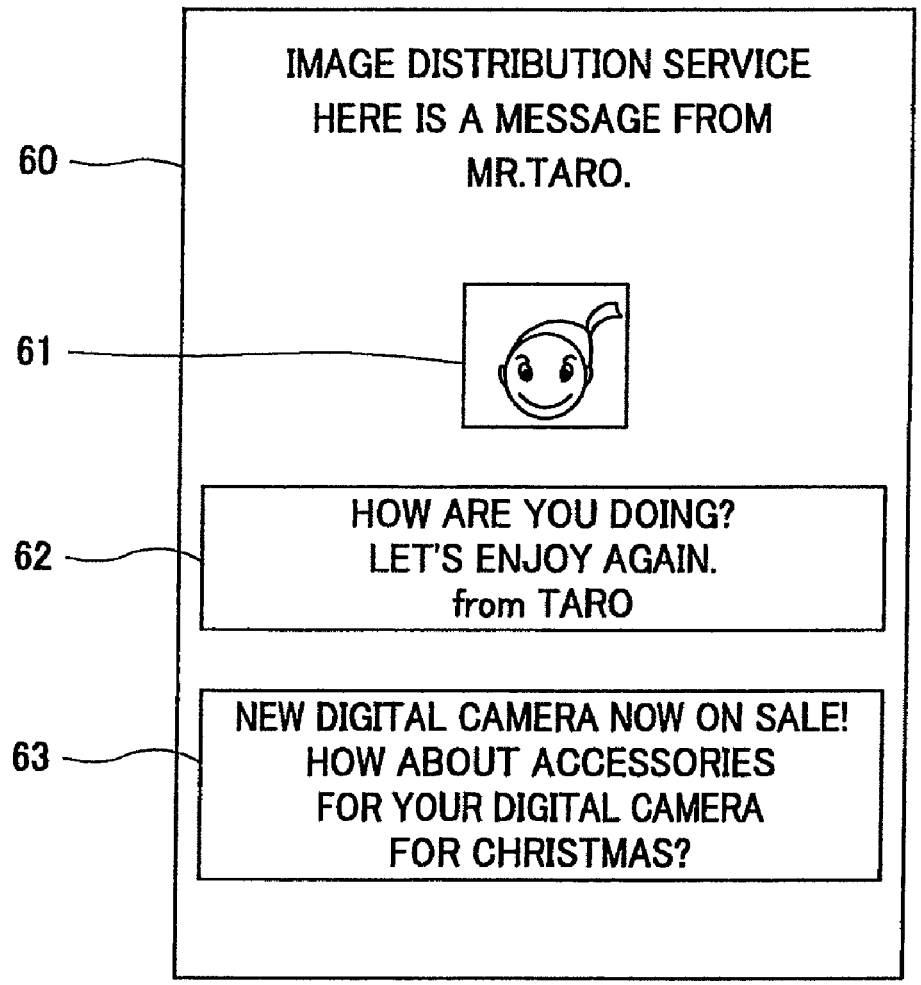
FIG. 14 is a view showing an exemplary screen structure that is transmitted to a portable radio communication terminal at a destination in the information distribution system according to the present invention.

FIG. 14 shows the Web page displayed in this case. On a Web page 60, image data 61 from the user 61, text data 62, and advertisement information 63 are displayed. In this case, the advertisement information 63 displayed on the Web page 60 is an advertisement based on the user's checking of the check box designating to "send it to my friend, too" on the result of transmission 40. However, it may also include other advertisement information.

In this manner, the information distribution system 2 can provide only necessary advertisement information for each individual by attaching advertisement information based on user information. Therefore, the advertising effect can be improved in comparison with distribution of certain advertisement information to many unspecified users.

In the information distribution system according to the present invention, as described above, when a user of the image data distribution system distributes, for example, image data processed by using a personal computer to a portable telephone unit, advertisement information is distributed to the user and the distribution recipient. However, the information distribution system can also be used as an image data distribution system which enables the user to access, retrieve, edit and retransmit image data from the user's portable telephone unit, with respect to the history of image data transmitted by the user using the image data processing device 11.

Figure 15:
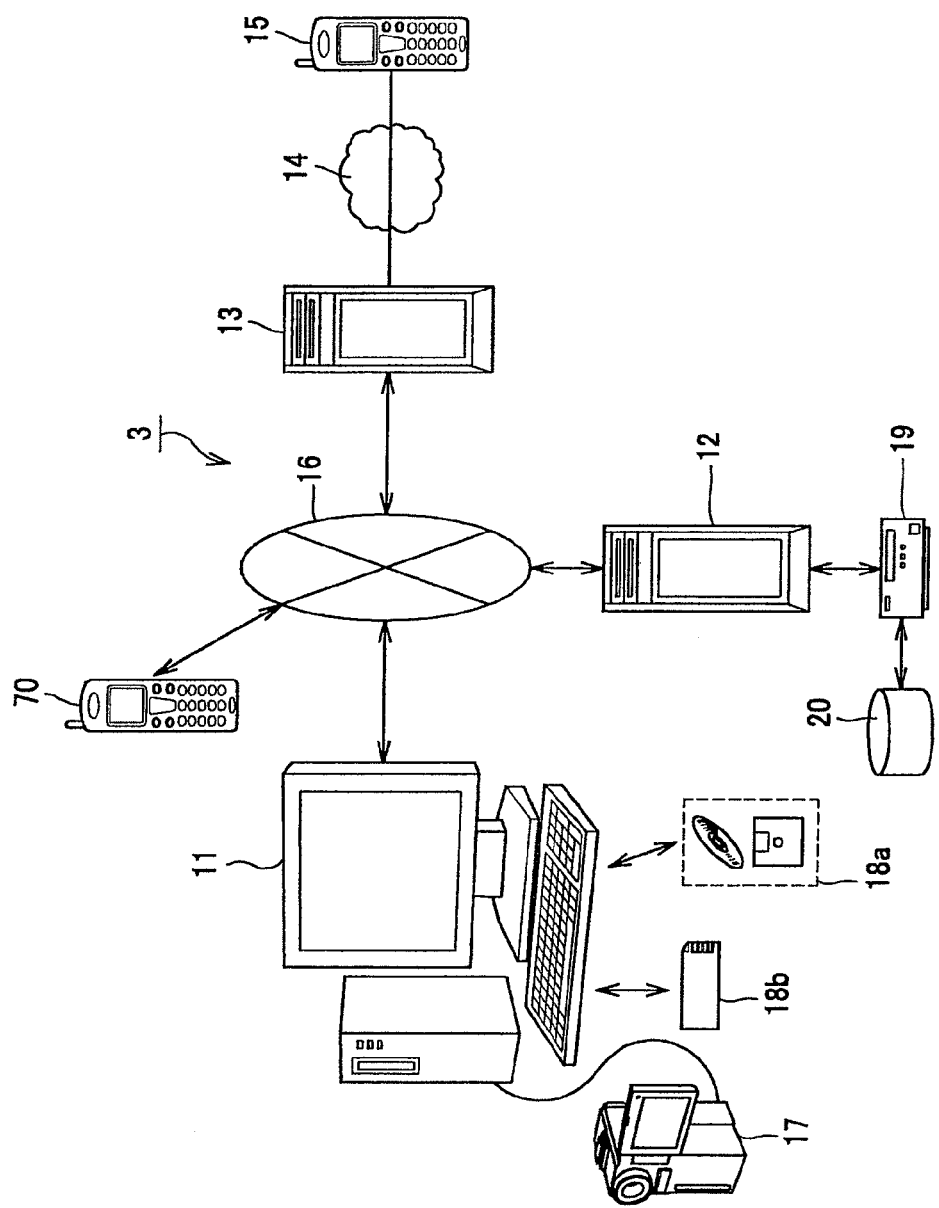
FIG. 15 is a structural view showing the schematic structure of an information distribution system to which the present invention is applied.

An information distribution system 3 as another specific example of the present invention has a user's portable telephone unit 70 in addition to the system structure shown in FIG. 1, as shown in FIG. 15, and it is characterized in that image/text data can be edited from the portable telephone unit 70 owned by the user. In the information distribution system 3 shown in FIG. 15, constituent elements having the same functions as those of the information distribution system 1 shown in FIG. 1 are denoted by the same numerals and will not be described further in detail.

In the information distribution system 3, using an image data distribution system that is made available by carrying out registration for use in advance, optimum advertisement information is distributed to the registered user and a recipient to whom the user wants to send image data, on the basis of the content of registration for use. The information distribution system 3 has the portable telephone unit 70, owned by the user, having a display unit for displaying an image data and a communication function, an image data processing device 11 having an image data processing function and a communication function, a server 12 for storing image data transmitted from the image data processing device 11, and a portable telephone base station 13 connected with a portable telephone unit 15 through a portable telephone communication network 14. It is assumed that the portable telephone unit 70 owned by the user is connected with a wire network 16 through a portable telephone communication network, similarly to the portable telephone unit 15. The wire network 16 is the so-called Internet.

The flow of information distribution in the above-described information distribution system 3 will be described with reference to FIGS. 16 and 17.

Figure 18:
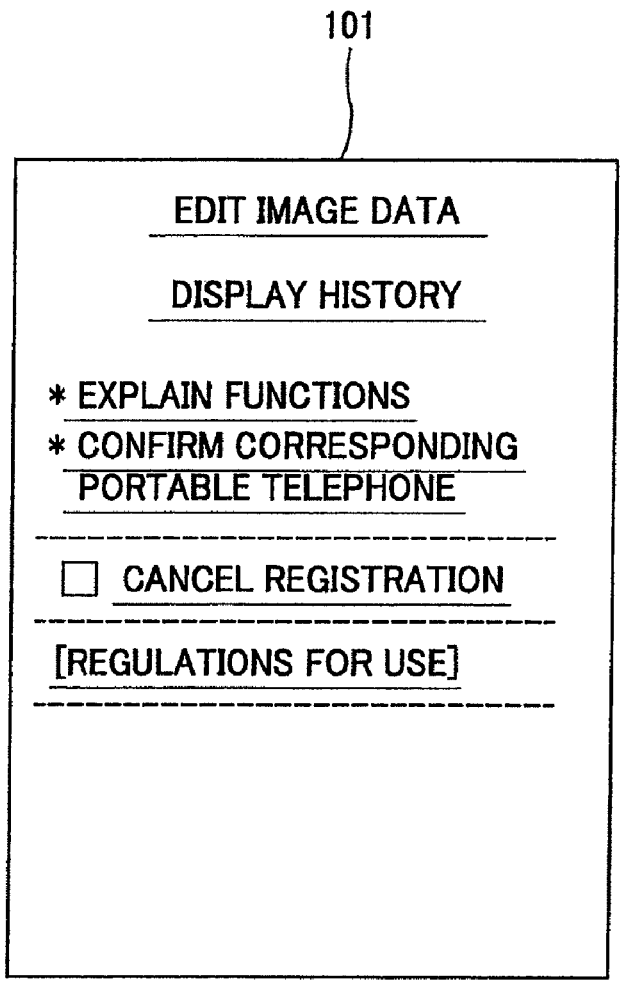
FIG. 18 is a view showing an exemplary top page screen that is transmitted to a user's portable radio communication terminal in the information distribution system according to the present invention.

The user connects to the server 12 by using the portable telephone unit 70. The user first accesses an information distribution service provision page, then selects a designated URL, and proceeds to the top page of the information distribution service (step S51). FIG. 18 shows an exemplary Web page of the image data distribution service displayed in this case. The portable telephone unit 70 acquires a top page 101 from the server 12.

Figure 19:
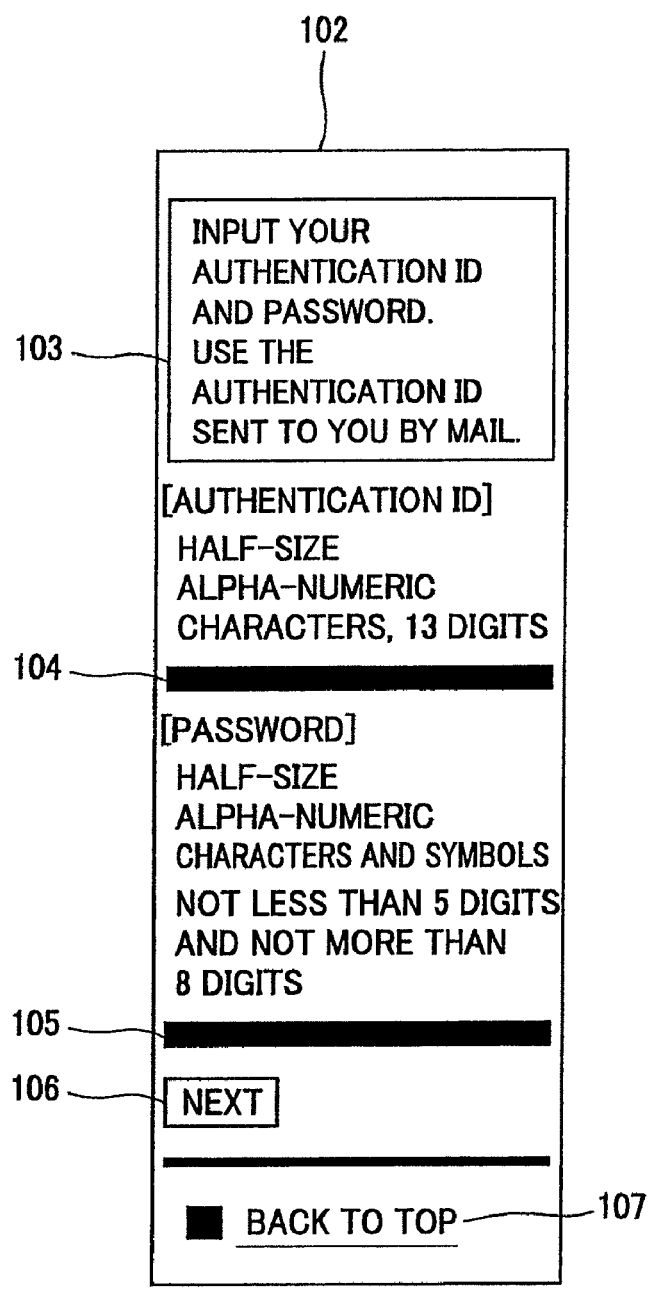
FIG. 19 is a view showing an exemplary authentication ID and password input screen that is transmitted to a user's portable radio communication terminal in another exemplary information distribution system to which the present invention is applied.

By selecting "Display history" on the top page 10 (step S52), the user can proceed to a registration authentication input display 102 of the image data distribution service shown in FIG. 19. In the registration authentication input display 102, a message 103 asking the user to input the authentication ID and password, an authentication ID input section 104, and a password input section 105 are displayed. Moreover, in the registration authentication input display 102, a "Next" button 106 to proceed and a back button 107 to return to the top page 101 are displayed.

Communication between the portable telephone unit 70 and the server 12 is secured by a function to encrypt texts to be transferred in a template style, for example, by a security technique such as SSL (Security Sockets Layer). Thus, the security of communication is realized by mutually confirming the signature, cipher and the like of the recipient (portable telephone unit 70) before the server 12 sends a text of a format supporting terminal of the distribution destination. Therefore, in this specific example, if the response is from a machine that does not support SSL, an error message as shown in FIG. 20 is displayed.

Figure 21:
FIG. 21 is a view showing an exemplary error message screen structure that is transmitted to a user's portable radio communication terminal in the information distribution system according to the present invention.
Figure 22:
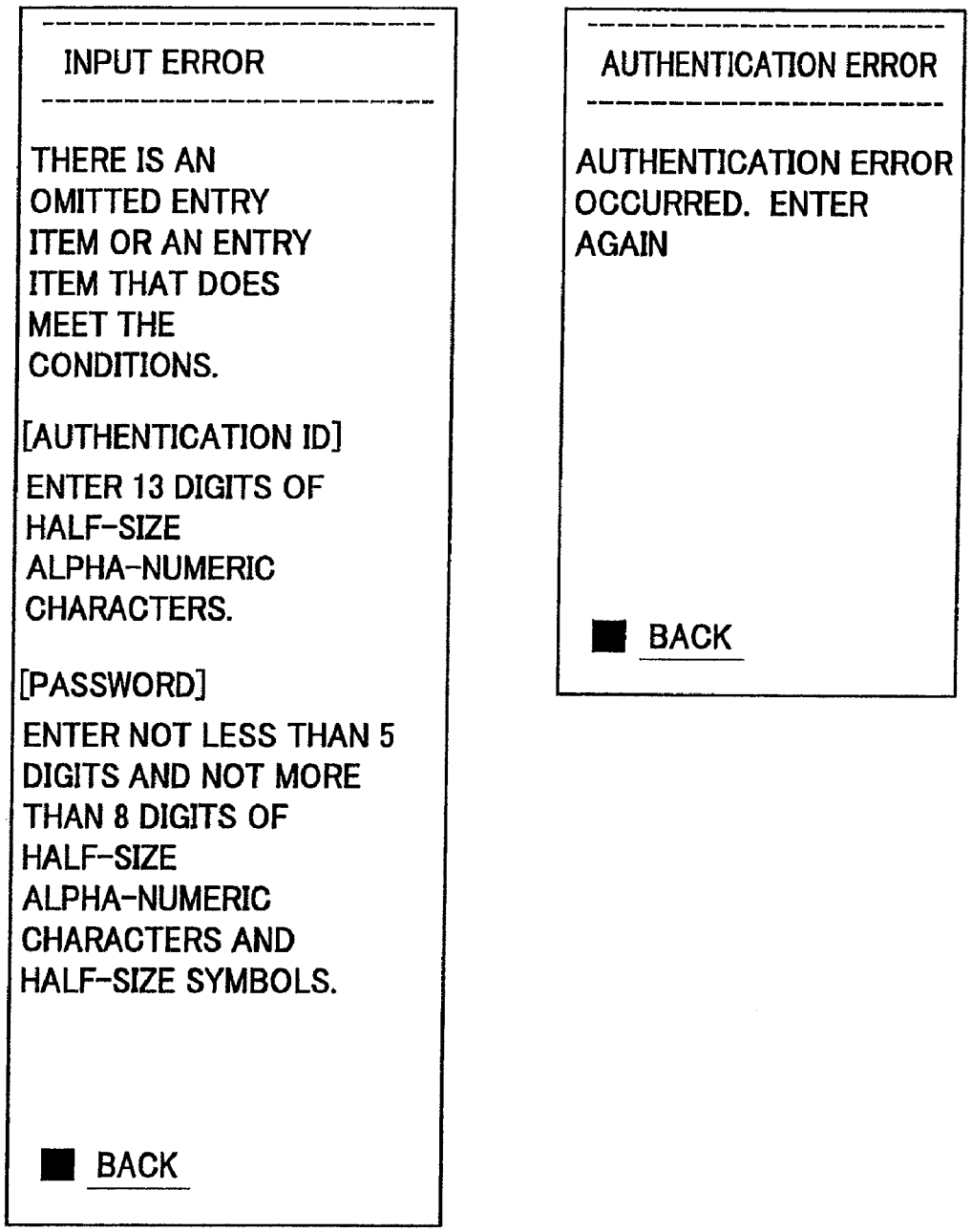
FIG. 22 is a view showing an exemplary error message screen structure that is transmitted to a user's portable radio communication terminal in the information distribution system to which the present invention is applied.

As entry in the authentication ID input section 104 and the password input section 105 is carried out by the user (step S53) and the authentication ID and password decided by the user's pressing the "Next" button 106 (step S54), the server 12 sends a deposited image list display 108 to the user's portable telephone unit 70 (step S55). If the user has not been registered to this service, the deposited image list display 108 is not presented. Moreover, in some cases, the deposited image list display 108 cannot be presented because of input errors in the authentication ID and password. In such cases, error messages shown in FIGS. 21 and 22 are displayed and the processing returns to step S53.

Figure 23:
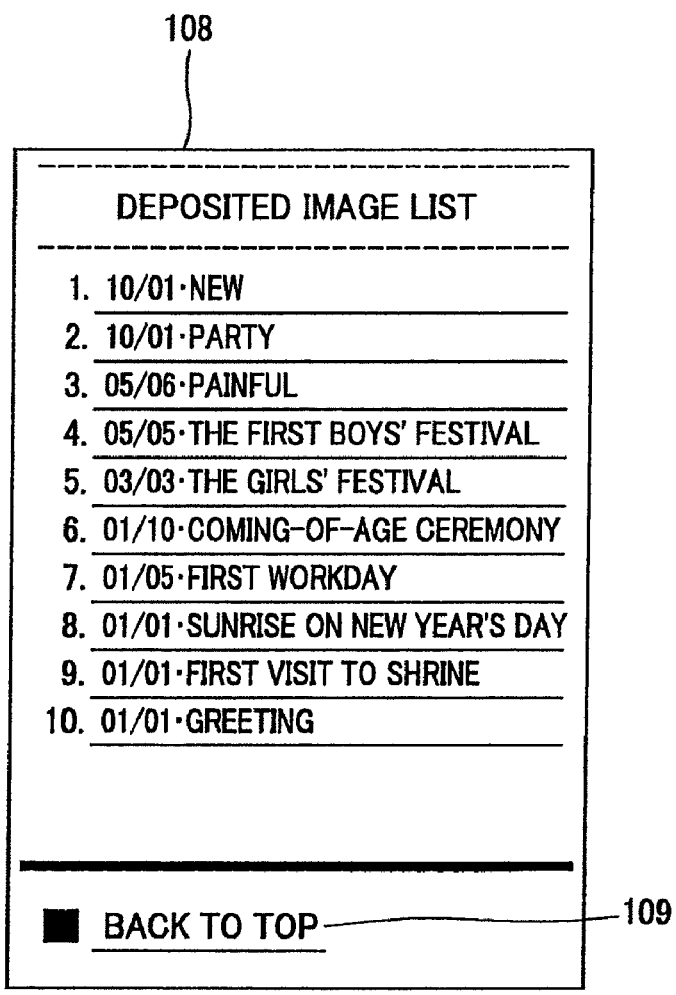
FIG. 23 is a view showing an exemplary deposited image list display screen that is transmitted to a user's portable radio communication terminal in still another exemplary information distribution system to which the present invention is applied.

FIG. 23 shows an exemplary deposited image display list. In the deposited image list display 108, a list showing display contents such as titles of image/text data that were distributed previously and a button 109 to return to the top page 101 are displayed. If the user selects one display content from the list showing display contents such as image/text data (step S56), the image/text data supporting the selected display content is displayed (step S57).

Figure 24:
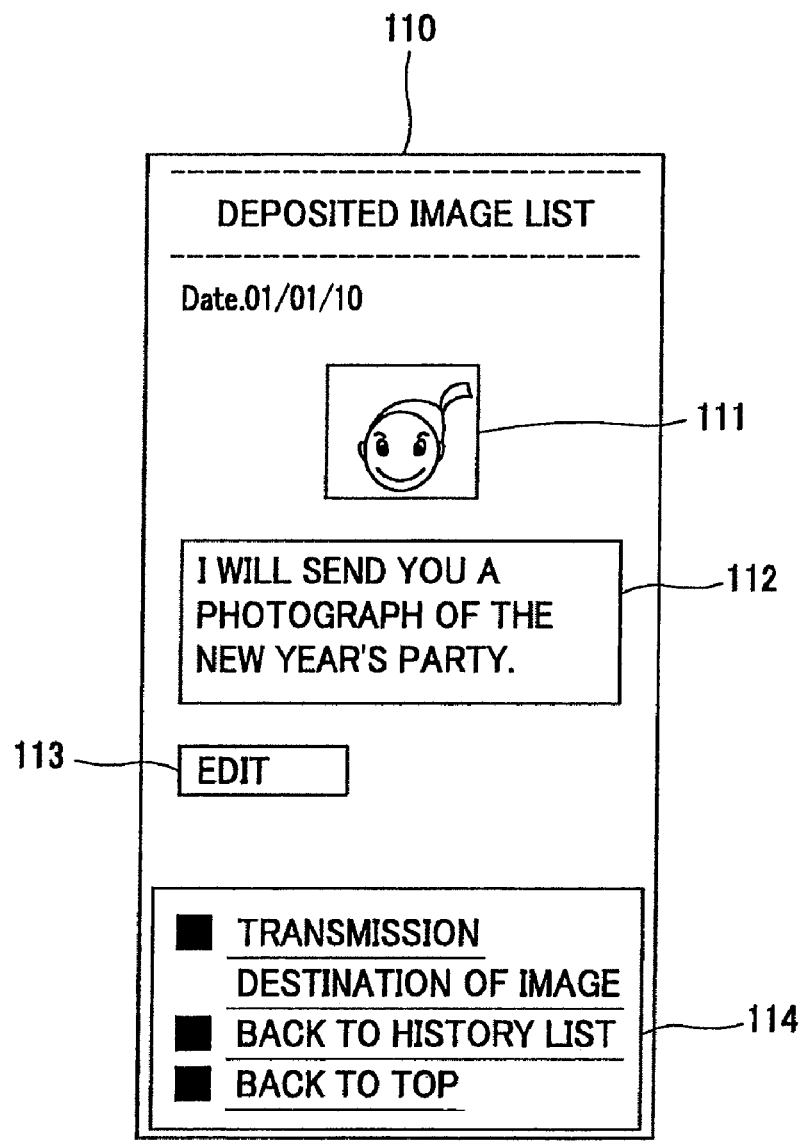
FIG. 24 is a view showing an exemplary image/text data screen selected from a deposited image list display screen that is transmitted to a user's portable radio communication terminal in still another exemplary information distribution system to which the present invention is applied.
Figure 25:
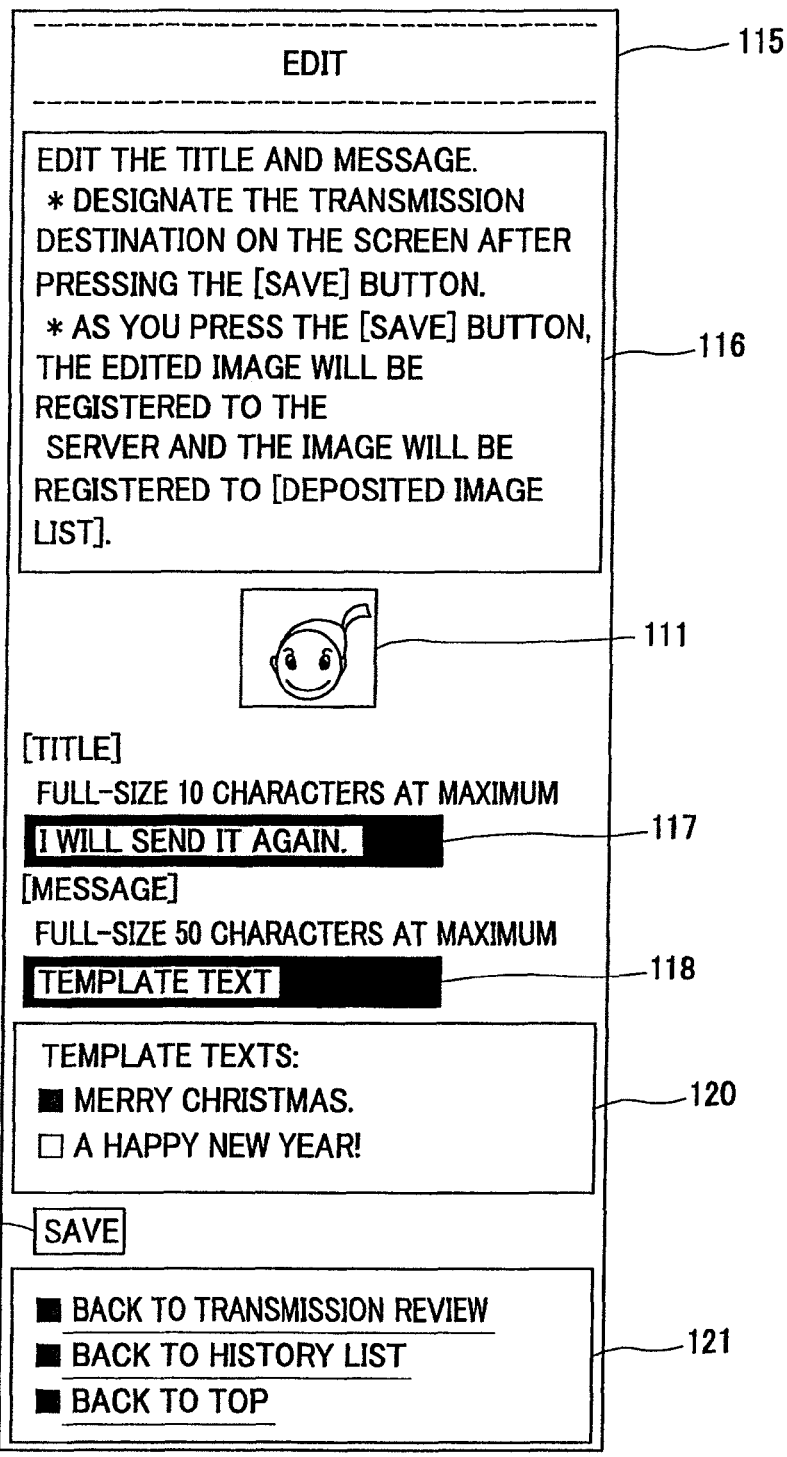
FIG. 25 is a view showing an exemplary editing screen that is transmitted to a user's portable radio communication terminal in still another exemplary information distribution system to which the present invention is applied.

FIG. 24 shows an example of image/text data 110 selected by the user. In the image/text data 110, image data 111, text data 112, an edit button 113 for editing these data, and selection buttons 114 for returning to the top page 101 and the previous page are displayed. If the edit button 113 is selected (step S58), an editing screen 115 shown in FIG. 25 appears (step S59).

In the editing screen 115, the image data 111, a message 116 for explaining operations, a title input section 117 for changing the title of this image/text data, and a message input section 118 are displayed. The user inputs contents to be modified in the title input section 117 and the message input section 118 by using the input part of the portable telephone unit 70, and selects a save button 119, thereby changing the title and message. In the editing screen 115, the user can also carry out simple editing of image data.

In addition, in the editing screen 115, plural template texts are prepared as texts with check boxes 120. If the user selects one of the texts with check boxes, the advertisement information appending unit 30 of the sever 12 attaches advertisement information corresponding to the content of the text. Moreover, selection buttons 121 for returning to the top page 101 and the deposited image list display 108 are displayed in the editing screen 115.

Figure 27:
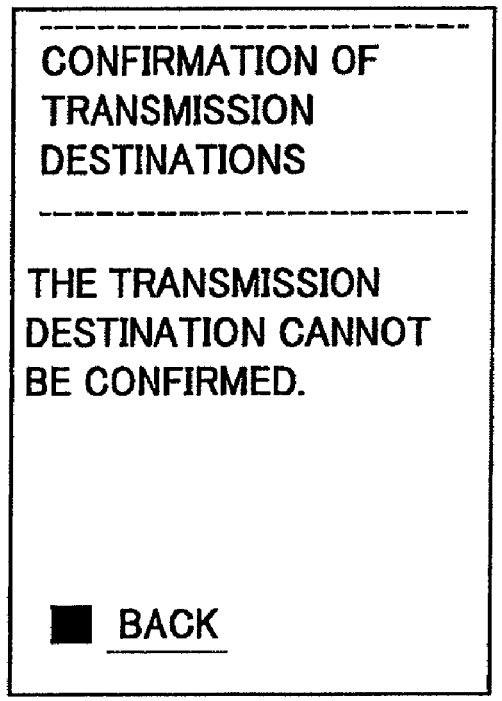
FIG. 27 is a view showing an exemplary transmission destination non-confirmation display screen that is transmitted to a user's portable radio communication terminal in still another exemplary information distribution system to which the present invention is applied.

If "transmission destination of image" is selected from the selection buttons 114 with the image/text data 110 displayed at step S57, the processing goes to step S60 and a transmission destination list shown in FIG. 26 is displayed. As a transmission destination is confirmed at step S61, the display returns to the image/text data 110. If the transmission destination has not been registered, the processing goes to step S62 and a transmission destination confirmation message shown in FIG. 27 is displayed. Then, the display returns to the image/text data 110.

Figure 16:
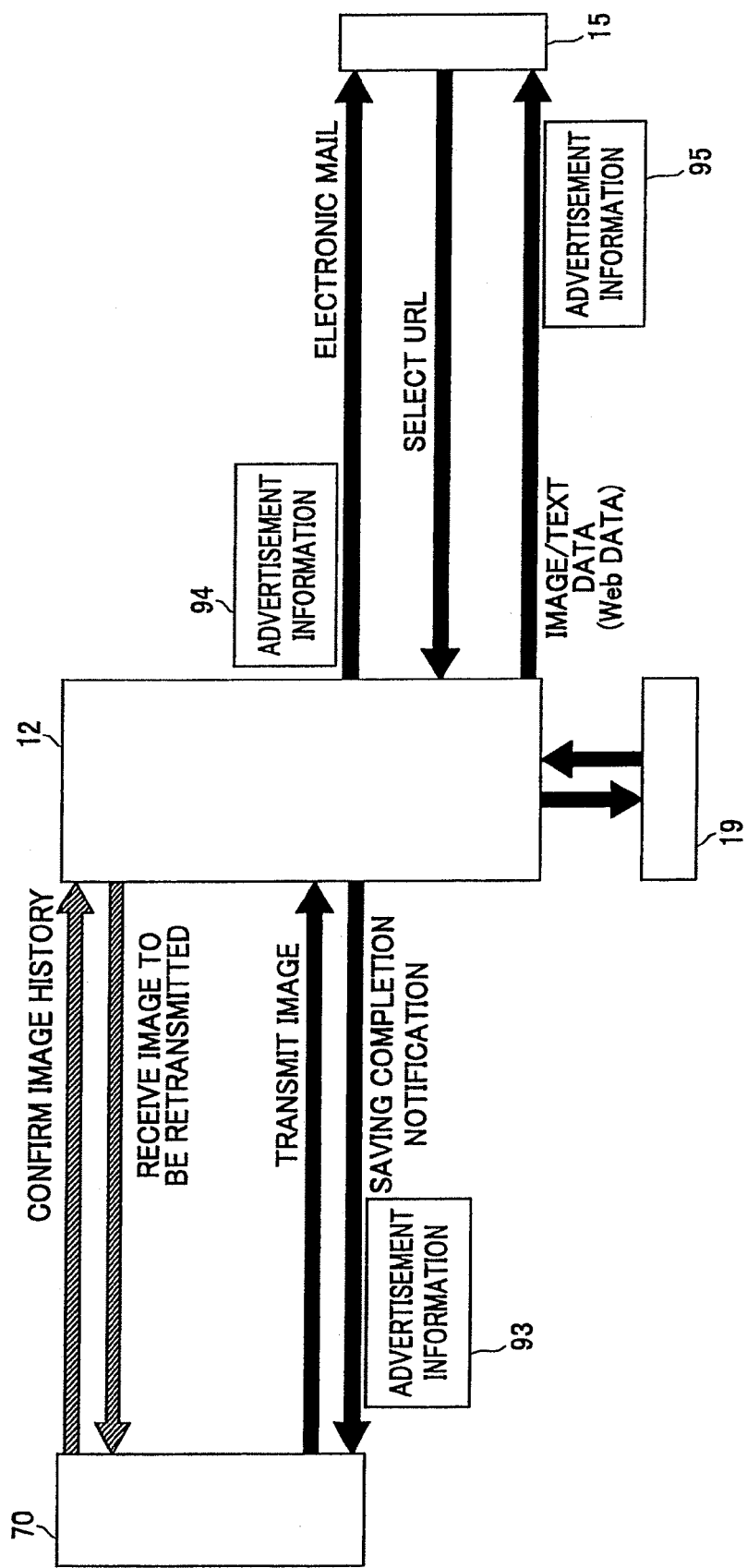
FIG. 16 is a schematic view for explaining the processing to append advertisement information in the information distribution system according to the present invention.
Figure 17:
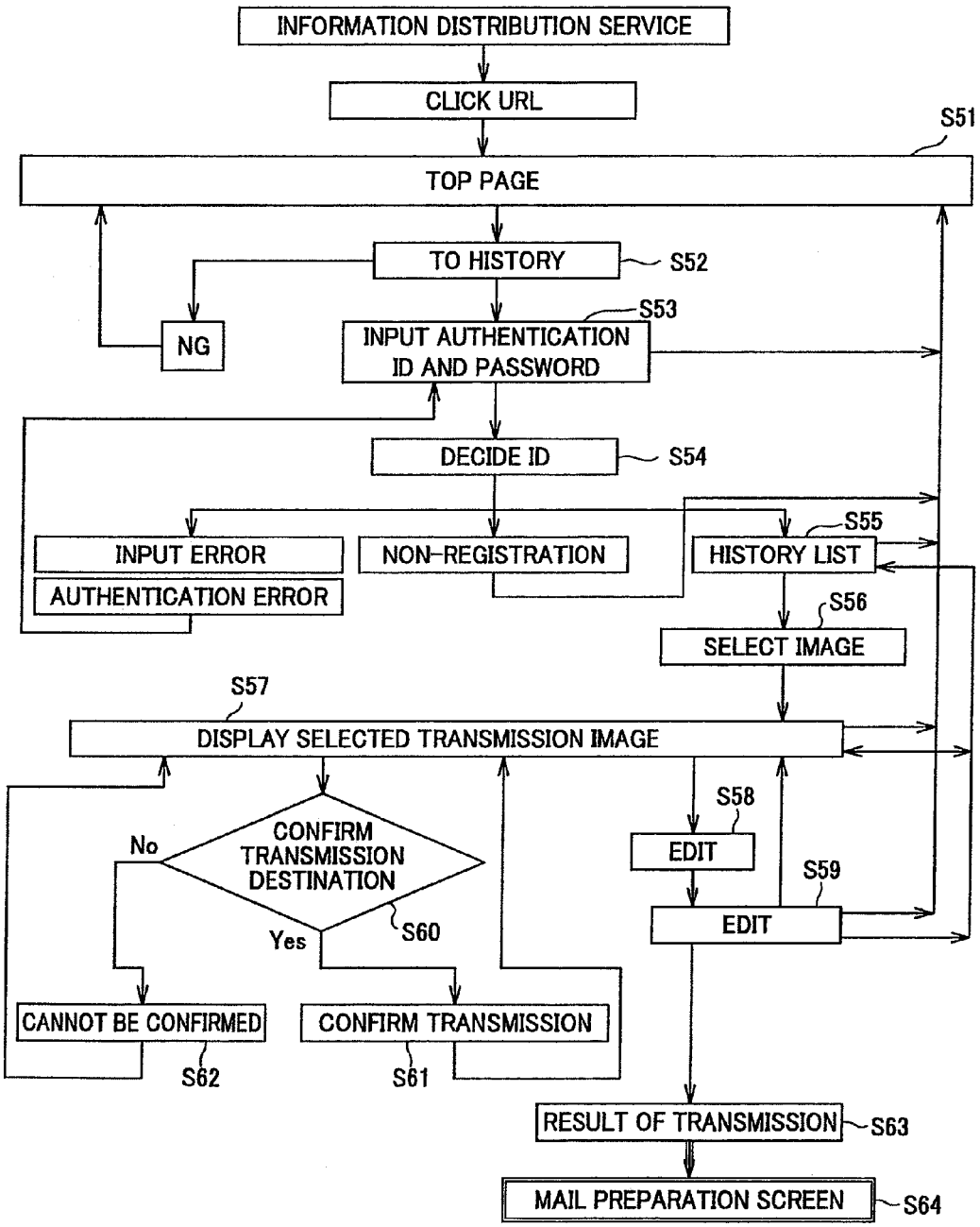
FIG. 17 is a flowchart for explaining the processing to edit image/text data saved into a server from a portable telephone unit in the information distribution system according to the present invention.

As the editing of the image/text data selected from the temporarily stored image/text data is completed by the above-described operations, the server 12 attaches advertisement information 93 to a saving completion notification to the effect that the image has been deposited, and sends it to the user's portable telephone unit 70 (step S63), as shown in FIG. 16.

Figure 28:
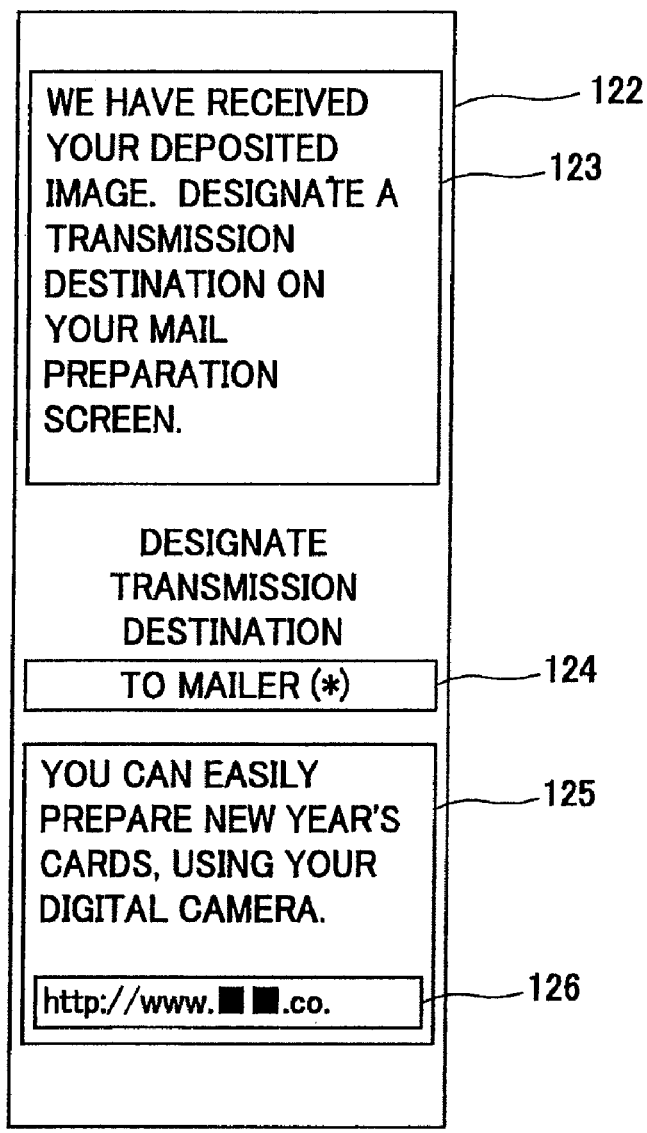
FIG. 28 is a view showing an exemplary saving completion notification screen that is transmitted to a user's portable radio communication terminal in still another exemplary information distribution system to which the present invention is applied.

FIG. 28 shows an exemplary saving completion notification 122. In the saving completion notification 122, a message 123 to the effect that image/text data has been deposited, and an input section 124 for designating a distribution destination of the saved image/text data are displayed. Moreover, advertisement information 125 extracted on the basis of user information is attached. A URL 126 showing the details of the advertisement information 125 may be attached to the advertisement information 125. The advertisement information 125 is equivalent to the advertisement information 93 of FIG. 16. The advertisement information 125 in this case is advertisement information extracted on the basis of the user information acquired from the user at the time of registration, that is, on the basis of the authentication ID and password of the user. The advertisement information 125 is advertisement information extracted from information based on gender and age of the user, peripheral equipments of the portable telephone unit 70 owned by the user, and the record of the user's purchase of goods in the past.

When selecting a distribution destination of the saved image/text data, the user can directly input the address of the distribution destination in the input section 124 or can select a so-called "mail-to" function defined as a standard of general portable telephone units.

Figure 29:
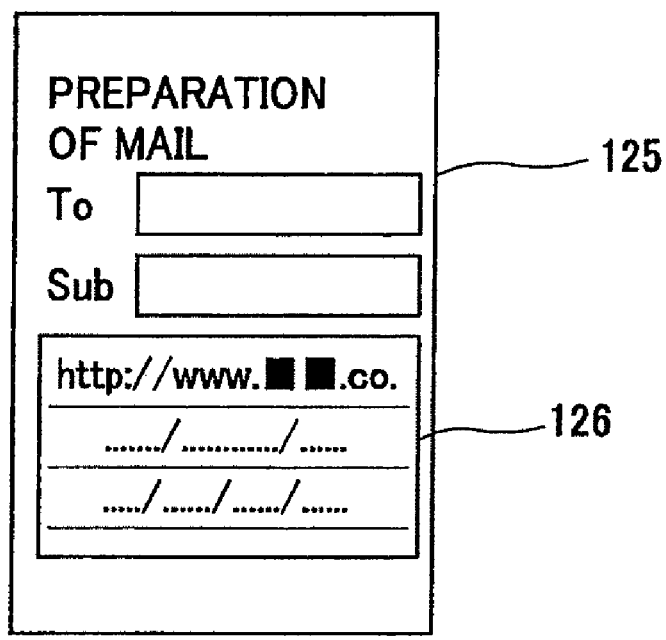
FIG. 29 is a view showing an exemplary mail preparation screen of a user's portable radio communication terminal in still another exemplary information distribution system to which the present invention is applied.

If the mail-to function is selected, the portable telephone unit will be in charge of controlling the subsequent input operation (step S64). An address storage function and a mail text preparation screen of the portable telephone unit are made available. As the mail-to function is selected, a mail text preparation screen as shown in FIG. 29 is displayed. That is, the control is shifted to the mail function of the portable telephone unit 70. In this case, in a mail preparation screen 125 shown in FIG. 29, a URL 126 indicating a new saving location of the edited image/text data is given and displayed. After that, the URL of the image/text data saved in the server 12 is transmitted to the distribution recipient by the ordinary mail function.

On the other hand, if the address of the distribution destination is directly inputted to the input section 124, a page having the screen structure shown in FIG. 13 is transmitted to the distribution recipient. In this case, advertisement information 94 can be attached, as shown in FIG. 16.

The distribution recipient can view the image/text data from the user, by selecting the URL transmitted thereto. Advertisement information 95 is attached to the image/text data acquired by the distribution recipient, as shown in FIG. 16. In this case, image/text data similar to that of FIG. 14 is sent to the distribution recipient.

In the case of an information processing terminal such as a personal computer, the user browse other displays while opening the Web page, by carrying out display operations such as changing the size of the display window or changing the location of the display window. However, in the case of an information processing terminal with a small display screen as in a portable telephone unit or an information processing terminal with poor display functions, the user must temporarily close the display window to view other displays.

For a user who has registered destination address such as e-mail addresses or the like to the address function of the portable telephone unit, an operation to input an address on a Web page is complicated.

In the information distribution system 3, the mail-to functions enables display of a URL indicating the saving location of image/text data in the server 12, in the ordinary mail preparation screen 125 of the portable telephone unit. Therefore, the address book provided as a function of the portable telephone unit can be used at the same time. The information distribution system according to the present invention can be suitably applied to an information processing terminal with a small display screen and an information processing terminal with poor display functions as well as a portable telephone unit.

With the information distribution system 3 to which the present invention is applied, it is possible to browse image/text data saved in the server 12, then edit and retransmit the image/text data, by using a portable telephone unit having no function to edit image/text data of a Web page or the like.

In the above-described top page 101, not only "display history" but also "explain functions", "confirm supporting machine type (SSL confirmation)" and "cancel registration" can be selected. The processing in the case where these are selected will be described hereinafter.

Figure 30:
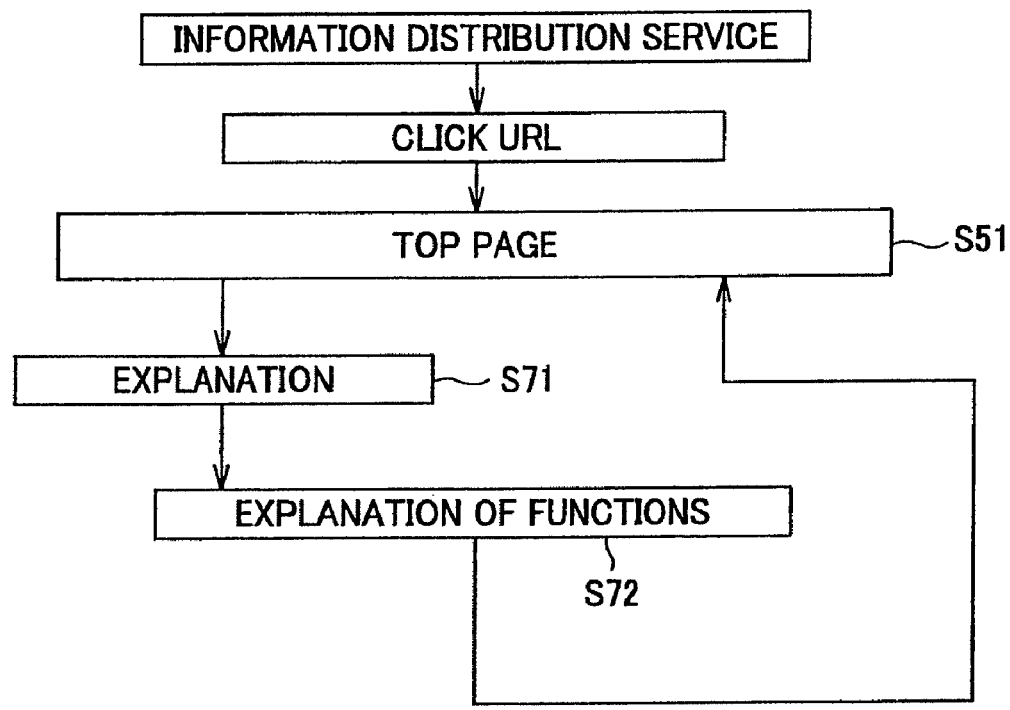
FIG. 30 is a flowchart for explaining the flow of explanation of functions of an information distribution service in still another exemplary information distribution system to which the present invention is applied.

If "explain functions" is selected in the top page 101 shown in FIG. 18, the processing shown in FIG. 30 is carried out. That is, when "explain functions" is selected (step S71), a function explanation screen is displayed (step S72) and the display can return to the top page 101 by a return operation.

Figure 31:
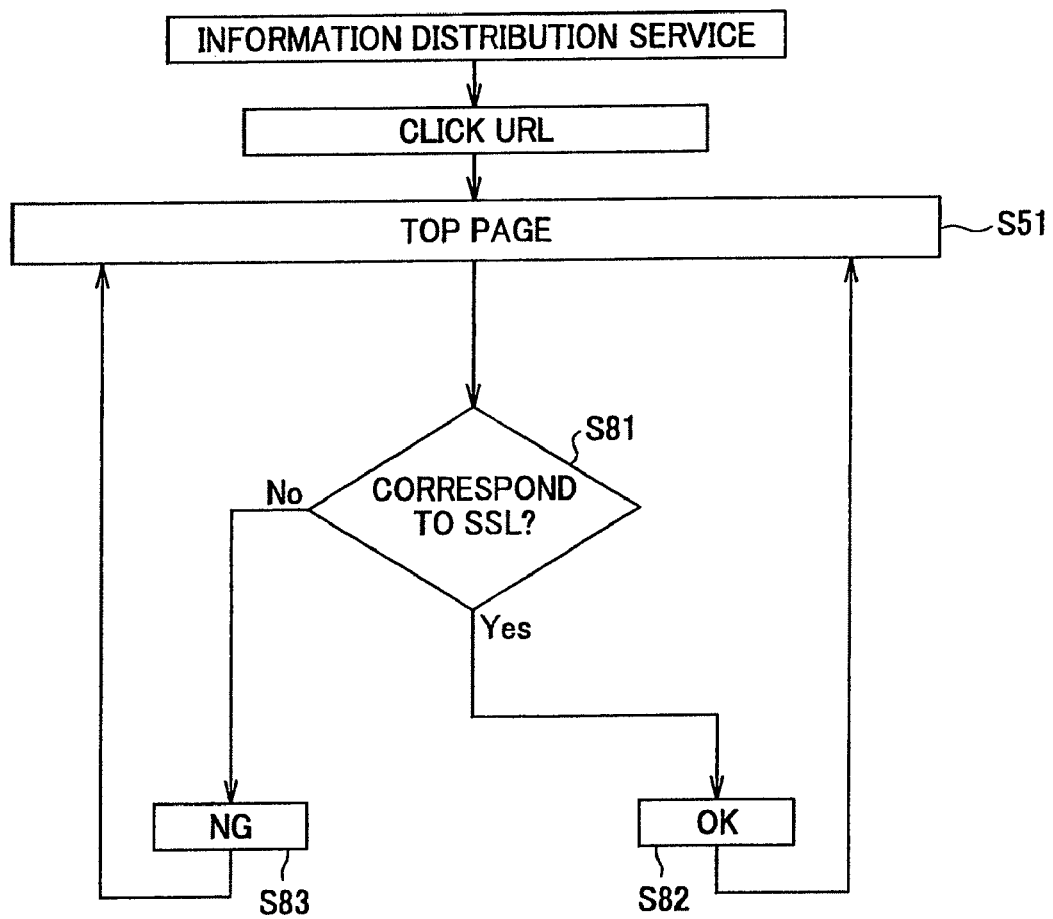
FIG. 31 is a flowchart for emplaning the flow of confirmation of machine type of an information distribution service in still another exemplary information distribution system to which the present invention is applied.

If "confirm supporting machine type" is selected in the top page 101 shown in FIG. 18 (step S81), the processing shown in FIG. 31 is carried out. If the machine type of the user's portable telephone unit 70 supports SSL, a message to the effect that the machine type supports SSL is displayed at step S82. If the machine type does not support SSL, the error message shown in FIG. 20 is displayed at step S83.

Figure 32:
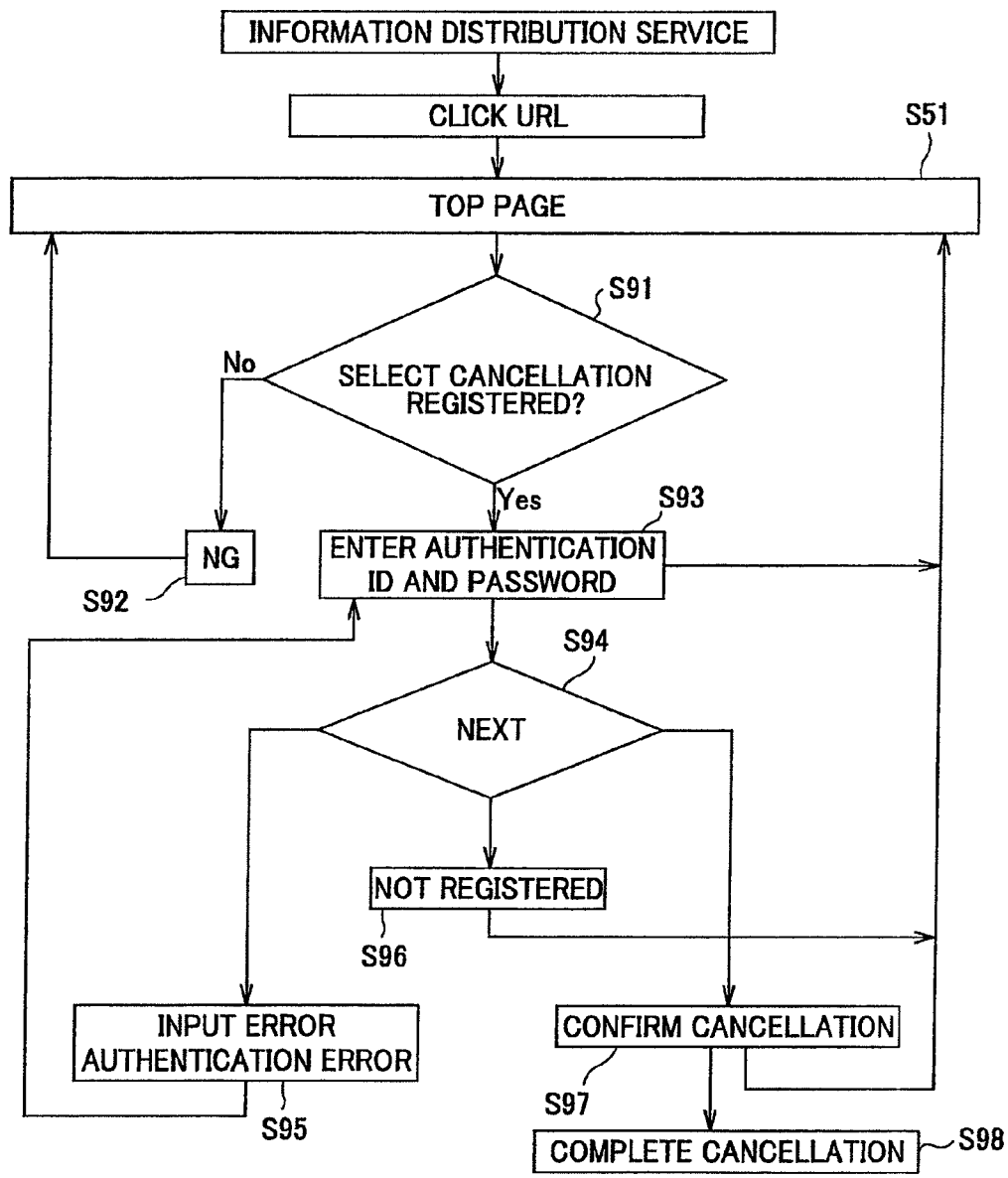
FIG. 32 is a flowchart for explaining the flow of cancellation of registration of an information distribution service in still another exemplary information distribution system to which the present invention is applied.

If "cancel registration" is selected, the processing shown in FIG. 32 is carried out. When "cancel registration" is selected (step S91), if registration has not been made, the message shown in FIG. 21 is displayed at step S92. If registration has been made, the user is prompted to input the authentication ID and password at step S93.

Figure 33:
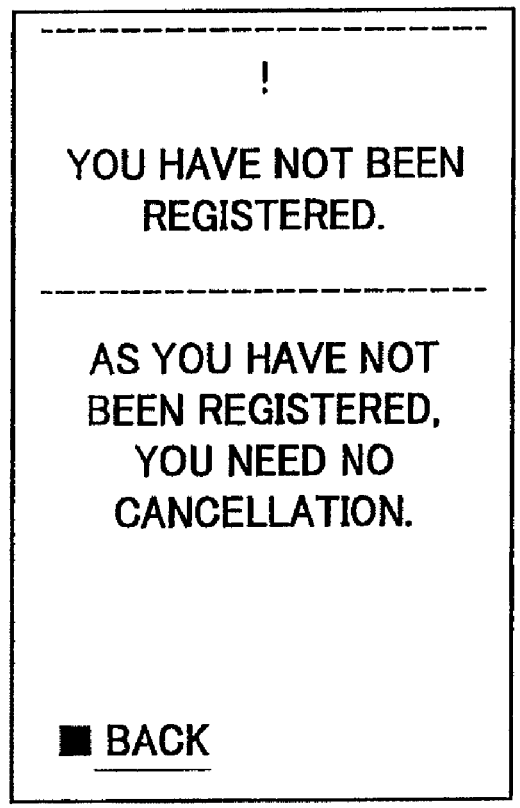
FIG. 33 is a view showing an exemplary screen structure that is transmitted to a user's portable radio communication terminal in still another exemplary information distribution system to which the present invention is applied.

When the authentication ID and password are inputted, the authentication ID and password are confirmed at step S94. In the case of an input error, the error message shown in FIG. 22 is displayed at step S95. If no registration has been made, a message shown in FIG. 33 to the effect that no registration has been made is displayed at step S96. As the authentication ID and password are confirmed, cancellation of registration is confirmed at step S97 and cancellation of registration is completed at step S98.

It is to be noted that the present invention is not limited to the above-described embodiments. As a matter of course, various modifications can be made without departing from the scope of the present invention. The portable communication terminal in the present invention may be any portable communication terminal having a data processing function and a communication function, such as a PDA (personal digital assistant) and a portable personal computer, and is not limited to a portable telephone unit. The screen displays used in the above description are examples and the displaying manner is not limited.

Even in the case of communication between general information processing terminals, by editing Web data temporarily uploaded to the server and saving a new Web page after editing, the server can transmit a command to start the mail-to function using the URL of the Web page as an argument, to the information processing terminal.

As described above, also in the information distribution system 3 shown in FIG. 15, the advertisement effect can be improved more by attaching advertisement information based on user information, than by distributing unnecessary advertisement information to many unspecified users.

In addition to advertisement information based on user information as described above, advertisement information may be attached in accordance with keywords extracted from information transmitted and received between the user and the distribution recipient.

INDUSTRIAL APPLICABILITY

An information distribution system according to the present invention is an information distribution system comprising a portable communication terminal having display means for displaying Web data including image data and text data and data transmitting/receiving means for transmitting/receiving the Web data, an information supplying device having data saving means for saving the Web data and information appending means for appending addresses for referencing the Web data from outside to the Web data, and another portable communication terminal having data acquisition means for acquiring the Web data and display means for displaying the web data. The list information of the Web data formulated in the past is displayed on the display means of the portable communication terminal, the text data contained in the Web data referenced by the Web data selected from the list information of the Web data displayed is modified and a new address is appended to the modified Web data.

Thus, with the information distribution system according to the present invention, the data once saved in the information supplying device can be browsed from a portable communication terminal and moreover can be modified and re-transmitted.

Another information distribution system according to the present invention is an information distribution system for distributing Web data from a first information processing terminal to a second information processing terminal. The information distribution system comprises an information supplying device having data saving means for saving formulated Web data and information appending means for appending an address for referencing the Web data from outside for the Web data, an information processing terminal having data acquisition means for acquiring the Web data having the address appended thereto, and display means for displaying the Web data. When a Web page is saved in the information processing terminal, the information supplying device transmits to the information processing terminal a command for booting a mail preparation screen with a URL (Uniform Resource Locator) of the Web page as an argument.

Thus, with the other information distribution system according to the present invention, the data once saved in the information supplying device can be browsed from a portable communication terminal and moreover can be modified and re-transmitted.

An information distribution method according to the present invention comprises a first information processing step having a display step of displaying Web data including image data and text data and a data transmitting/receiving step of transmitting/receiving the Web data, an information supplying step having a data saving step of saving the Web data and an information appending step of appending an address for referencing the Web data from outside of the Web data, and a second information processing step having a data acquisition step of acquiring the Web data and a display step of displaying the web data. The text data contained in the Web data referenced by Web data selected from the list information of the Web data formulated in the past is modified, and a new address is appended to the as-modified Web data.

Thus, with the other information distribution method according to the present invention, the data once saved in the information supplying device can be browsed from a portable communication terminal and moreover can be modified and re-transmitted.

An information distribution method for distributing Web data from a first information processing terminal to a second information processing terminal, according to the present invention, comprises an information supplying step having data saving step for saving formulated Web data and an information appending step for appending an address for the Web data for referencing the Web data from outside, and an information processing step having data acquisition step for acquiring the Web data having the address appended thereto, and a display step for displaying the Web data. When a Web page is saved in the information processing step, the information supplying step transmits to the information processing step a command for booting a mail preparation screen with a URL (Uniform Resource Locator) of the Web page as an argument.

With the other information distribution method according to the present invention, the data once saved in the information supplying device can be browsed from a portable communication terminal and moreover can be modified and re-transmitted. Additionally, since the "mail-to" function, provided as the function proper to the portable communication terminal, may be used in selecting the destination of distribution, the address inputting, which has so far been cumbersome for the user, can be simplified.

An information supplying apparatus according to the present invention comprises data saving means for saving Web data having image data and text data, information appending means for appending an address to the Web data for referencing the data from outside and transmission means for transmitting to a portable communication terminal the list information of the Web data formulated in the past. The information appending means appends new addresses to new data including text data modified in the portable communication terminal.

With the information supplying device according to the present invention, the data once saved in the information supplying device can be browsed from a portable communication terminal and moreover can be modified.

An information supplying method according to the present invention comprises a data saving step of saving Web data having image data and text data, an information appending step of appending an address to the Web data for referencing the Web data from outside and a transmission step of transmitting to a portable communication terminal the list information of the Web data formulated in the past. The information appending step appends a new address to new data including text data modified in the portable communication terminal.

With the information supplying method according to the present invention, the data once saved in the information supplying device can be browsed from a portable communication terminal and moreover can be modified.

An information processing terminal according to the present invention comprises data transmitting/receiving means for transmitting/receiving the Web data, having a function of formulating a Web page using Web data including image data and text data and a "mail-to" function. On formulating a Web page, a mail preparation screen in the main text of which has been inserted a URL (Uniform Resource Locator) of the Web page is booted.

With the information processing terminal according to the present invention, the data once saved in the information supplying device can be browsed from a portable communication terminal and moreover can be modified and re-transmitted. Additionally, since the "mail-to" function, provided as the function proper to the portable communication terminal, may be used in selecting the destination of distribution, the address inputting operation, which has so far been cumbersome for the user, can be simplified.

An information processing method according to the present invention comprises a step of formulating a Web page using Web data including image data and text data and a data transmitting/receiving step of transmitting/receiving the Web data. On formulating a Web page, a mail preparation screen in the main text of which has been inserted a URL (Uniform Resource Locator) of the Web page is booted. With the information processing method according to the present invention, the data once saved in the information supplying device can be browsed from the portable communication terminal and moreover can be modified and re-transmitted.

Additionally, with the information processing method, since the "mail-to" function, provided as the function proper to the portable communication terminal, may be used in selecting the destination of distribution, the address inputting, which has so far been cumbersome for the user, can be simplified.

The invention claimed is:

1. An apparatus comprising:
 a receiving unit configured to receive image data from an external device;
 a storage unit configured to store the received image data; and
 a transmitting unit for transmitting a notification indicating a completion of storing the image data to the external device; and
 a displaying unit for displaying (1) the notification indicating the completion of the storing of the image data, (2) a message indicating that the image data is stored, and (3) an input section for designating a distribution destination of the image data,
 wherein the notification comprises a command to start an electronic communication function of the external device,
 wherein, when selecting a distribution destination of the saved data, a user can select a mail-to function, and
 wherein if the mail-to function is selected, a portable telephone unit controls subsequent input operation.

2. The apparatus according to claim 1,
 wherein when the external device receives the notification from the apparatus, the electronic communication function is started on the external device.

3. The apparatus according to claim 1,
 wherein the notification comprises an address accessing the stored image data, said address being displayed on an electronic communication screen of the external device when the electronic communication function is started.

4. The apparatus according to claim 3,
 wherein the notification comprises advertisement information.

5. The apparatus according to claim 3,
 wherein, when the electronic communication function is executed on the external device, a recipient device receives a message comprising the address for accessing the stored image received from the external device and stored in the storage unit.

6. An information distribution method comprising the steps of:
 receiving image data from an external device;
 storing the image data received from the external device;
 transmitting to the external device, a notification indicating completion of the storing of the received image data and a command to start an electronic communication function on the external device; and
 displaying (1) the notification indicating the completion of the storing of the image data, (2) a message indicating that the image data is stored, and (3) an input section for designating a distribution destination of the image data,
 wherein, when selecting a distribution destination of the saved data, a user can select a mail-to function, and
 wherein if the mail-to function is selected, a portable telephone unit controls subsequent input operation.

7. The information distribution method according to claim 6, further comprising the steps of:
 transmitting an address for accessing the stored image data.

8. The information distribution method of claim 7,
 wherein when the external device starts an electronic communication function, an electronic communication screen is displayed on the external device, and
 wherein the electronic communication screen displays the address for accessing the stored image data.

9. The information recording apparatus according to claim 8,
 wherein the notification comprises advertisement information.

10. The information recording apparatus according to claim 8, further comprising the steps of:
 transmitting to a recipient device, the stored image data after the recipient device receives a message comprising the address for accessing the stored image data from the external device.

11. The information recording apparatus according to claim 10, further comprising the steps of:
 transmitting advertisement information to the recipient device.

12. An information distribution method comprising the steps of:
 transmitting image data to an external device;
 receiving a notification indicating that the external device received and stored the image data,
 displaying (1) the notification indicating the completion of the receiving (2) a message indicating that the image data is stored, and (3) an input section for designating a distribution destination of the image data; and
 starting an electronic communication function when the notification is received,
 wherein, when selecting a distribution destination of the saved data, a user can select a mail-to function, and
 wherein if the mail-to function is selected, a portable telephone unit controls subsequent input operation.

13. The information distribution method according to claim 12,
 wherein the notification comprises an address for accessing the stored image data.

14. The information distribution method according to claim 13, further comprising the steps of:
 displaying an electronic communication screen which displays the address of the stored image data.

15. The information distribution method according to claim 14,
 wherein the notification comprises advertisement information.

16. The information recording apparatus according to claim 14, further comprising the steps of:
 transmitting a message to a recipient device comprising the address for accessing the stored image data.

17. The information distribution method according to claim 16,
 wherein advertisement information and the message comprising the address for accessing the stored image data are transmitted to the recipient device.

18. A method of receiving information comprising:
 receiving a message from an external device comprising a name of a sender and an address for accessing stored image data,
 accessing the stored image data; and
 receiving image data from a second external device which is storing the image data, wherein the external device displays (1) a notification indicating a completion of a storing of the image data, (2) a message indicating that the image data is stored, and (3) an input section for designating a distribution destination of the image data,
wherein, when selecting a distribution destination of the saved data, a user can select a mail-to function, and
wherein if the mail-to function is selected, a portable telephone unit controls subsequent input operation.

19. The method of receiving information according to claim 18, further comprising the steps of:

receiving advertisement information after accessing the stored image data.

* * * * *